United States Patent [19]

Fellinger et al.

[11] 4,402,079
[45] Aug. 30, 1983

[54] DELAY CORRECTION CIRCUIT

[75] Inventors: Frank Fellinger; James M. Ruffing, both of Delaware, Ohio

[73] Assignee: International Telephone and Telegraph Corporation, New York, N.Y.

[21] Appl. No.: 200,341

[22] Filed: Oct. 24, 1980

Related U.S. Application Data

[62] Division of Ser. No. 937,456, Aug. 28, 1978, Pat. No. 4,230,911.

[51] Int. Cl.³ .................... G06F 13/00; G11B 13/00
[52] U.S. Cl. ...................................... 370/84; 370/108
[58] Field of Search ............................ 370/108, 84; 364/900 MS File, 200 MS File; 375/106; 179/15.55 T

[56] References Cited

U.S. PATENT DOCUMENTS

| | | | |
|---|---|---|---|
| 3,500,330 | 3/1970 | Hertz | 364/900 |
| 4,121,058 | 10/1978 | Jusko et al. | 179/15.55 T |
| 4,271,483 | 6/1981 | Baldwin et al. | 370/108 |

Primary Examiner—Thomas A. Robinson
Attorney, Agent, or Firm—James B. Raden; Donald J. Lenkszus

[57] ABSTRACT

A delay correction circuit is described for use with an elastic store in a PCM time division multiplexed system. The relative position of the read and write addresses supplied to the elastic store are monitored. In the event that either the read or write addresses are overtaking the other and are within a predetermined range of addresses, either the read or write address source will be initialized at a predetermined time such that the read and write addresses have new relative position.

1 Claim, 16 Drawing Figures

FRAME SEARCH GROUPS

| GROUP 1 | GROUP 2 | GROUP 3 | GROUP 4 | GROUP 5 | GROUP 6 | GROUP 7 | GROUP 8 |
|---|---|---|---|---|---|---|---|
| 0 | 321 | 256 | 191 | 126 | 61 | 382 | 317 |
| 4 | 325 | 260 | 195 | 130 | 65 | 0 | 321 |
| 8 | 329 | 264 | 199 | 134 | 69 | 4 | 325 |
| . | . | . | . | . | . | . | . |
| . | . | . | . | . | . | . | . |
| . | . | . | . | . | . | . | . |
| . | 385 | . | . | . | . | . | 385 |
| . | 3 | . | . | . | . | . | 3 |
| . | . | . | . | . | . | . | . |
| . | . | . | . | . | . | . | . |
| . | . | 384 | . | . | . | . | . |
| . | . | 2 | . | . | . | . | . |
| . | . | . | . | . | . | . | . |
| . | . | . | . | . | . | . | . |
| . | . | . | 383 | . | . | . | . |
| . | . | . | 1 | . | . | . | . |
| . | . | . | . | . | . | . | . |
| 252 | 187 | 122 | 57 | 378 | 313 | 248 | 183 |

FIG. 12

| WHEN READ QUADRANT AND READ ADDRESS COUNTER ARE | | | SET WRITE QUADRANT AND WRITE ADDRESS COUNTER TO | |
|---|---|---|---|---|
| RQC | RAC | THEN | WQC | WAC |
| 4 | 224-225 0 | | 2 | 192 |
| 1 | 0-159 | | 2 | 192 |
| 1 | 160-192 | | 3 | 128 |
| 2 | 192-255 | | 3 | 128 |
| 2 | 0-95 | | 3 | 128 |
| 2 | 96-128 | | 4 | 64 |
| 3 | 128-255 | | 4 | 64 |
| 3 | 0-31 | | 4 | 64 |
| 3 | 32-64 | | 1 | 0 |
| 4 | 64-223 | | 1 | 0 |

*FIG. 16*

DELAY CORRECTION CIRCUIT

CROSS REFERENCE TO RELATED APPLICATIONS

This application is a division of our co-pending U.S. Patent Application Ser. No. 937,456 filed Aug. 28, 1978 for a "Carrier Terminal Unit", now U.S. Pat. No. 4,230,911, issued Oct. 28, 1980, and which is assigned to a common assignee.

BACKGROUND OF THE INVENTION

This invention pertains to telephone switching systems in general and to a digital trunk circuit for use in interfacing digital transmission lines and digital electronic telephone switching systems, in particular.

Where a digital transmission line is used to interconnect a digital switching network of a Central Office with remote equipment such as a remote line switch, a channel bank or another digital office, a carrier terminal unit (CTU) or span interface is used to provide the terminating functions for the transmission line. Presently, the primary digital carrier DS1 employed in North America consists of 24 pcm channels, 1.544 Mb/s bit rate and D2/D3 signaling format.

The receive section of a carrier terminal unit must perform the following functions:

(a) conversion of bipolar DS1 signals from the T1 line to unipolar return-to-zero and nonreturn-to-zero DS1 signals;

(b) extract a bit clock from the return-to-zero data stream in the presence of consecutive zeroes and pattern-induced jitter;

(c) provide bit and frame alignment;

(d) provide frame detection including in-frame monitoring, framing search and frame alignment.

It has been found particularly advantageous in one recently developed family of time-division multiplexed switching systems under development by ITT North Electric Company and called DSS to switch voice paths at a 2.048 Mb/s rate. Various aspects of the DSS family of systems have been described by N. J. Skaperda in "Generic Digital Switching System", International Switching Symposium, Vol. 1, October, 1976 by C. G. Svala in "DSS-1, A Digital Local Switching System with Remote Line Switches", proceedings of the National Telecommunications Conference, p 3915-1 1977; and by F. Fellinger in "Modular Digital Switching Network", International Communications Conference, June 4-7, 1978.

A carrier terminal unit for a system such as DSS must, in addition to providing the functions listed above, provide for converting the 1.544 Mb/s incoming DS1 data stream to the 2.048 Mb/s data rate employed in DSS as well as convert the format to that employed in DSS.

SUMMARY OF THE INVENTION

In accordance with the principles of the invention, a carrier terminal unit is obtained which provides the following functions:

a. An incoming 1.544 MHz bipolar incoming signal from a T1 line is terminated and converted from bipolar to unipolar signals.

b. The bit clock of the T1 line is extracted from the incoming data stream.

c. The incoming framing signal is detected within an average reframe time of 50 msec. The framing circuit detects framing on a conventional framing code or on a signal frame identification code.

d. Bit and single frame timing adjustments are made to the incoming signal to align it to 2.048 MHz timing. An elastic store of one frame is provided for single frame alignment.

e. Delay variations are compensated.

f. The standard incoming 1.544 MHz T1 line format of 193 bits per frame, comprising 24 8-bit voice channels and one framing bit is converted to a 2.048 MHz system format of 256 bits per frame comprising 24 10 bit voice channels, one 10-bit common signaling channel and six "don't care" bits. Each of the 10-bit voice channels includes 8 voice bits, a parity bit and a signaling bit.

In accordance with the principles of the invention, rate and format conversion of incoming PCM signals each represented as a data bit and having a first clock rate to outgoing PCM signals having a second clock rate and format are obtained by synchronizing each incoming data bit to the second clock rate. Signaling information is extracted from the synchronized data stream and is stored in a first memory. The remaining data bits in the data stream are stored in a second memory. The data bits stored in the second memory are read at the second clock rate in accordance with a predetermined sequence. The data bits read from the second memory are time multiplexed with selected signaling information obtained from the first memory in accordance with the predetermined sequence to obtain the outgoing PCM signals.

Further in accordance with the principles of the invention, a delay correction circuit is provided, wherein the relative positions of the read and write addresses supplied to the second memory are monitored. In the event that either the read or write addresses are overtaking the other and are within a predetermined range of addresses, either the read or write address source will be initialized at a predetermined time such that the read and write addresses have new relative positions.

Also in accordance with the principles of the invention, a framing detection circuit is provided. If frame synchronization is lost, the framing detection circuit will identify the bit position in the incoming data stream that contains the framing pattern.

A memory is arranged in groups of storage locations. Each group includes storage locations. Every nth incoming bit starting from a reference bit position out of a pair of frames is stored in a corresponding location of each group such that after n−1 pairs of incoming frames, each location in a group will contain the corresponding nth bit of a pair of frames. When the data bits from the nth pair of frames arrive, each incoming nth bit is compared with a corresponding nth bit from an earlier frame read from the memory. A history bit is stored in the nth storage location of each group to indicate whether or not the predetermined pattern is present in the compared bits. Each subsequent nth bit is similarly compared. If after each nth bit of the nth pair of frames is compared, at least one history bit indicates that the predetermined pattern is present, the framing bit has been found.

If, however, none of the history bits indicates that the predetermined pattern is present, then the reference bit position is changed and the comparisons are repeated. This process is repeated until at least one history bit indicates that the predetermined pattern has been obtained.

Further in accordance with the invention, after at least one history bit indicates detection of the predetermined pattern, the comparisons will continue for a predetermined number of times so that aliasing of the predetermined pattern is reduced.

DESCRIPTION OF THE DRAWINGS

The invention may be better understood from a reading of the following detailed description taken in conjunction with the drawings in which like reference designations throughout the several drawings refer to like elements and in which:

FIG. 12 is a table of frame search groups;

FIG. 14 illustrates a pattern detection circuit used for frame searching;

FIG. 15 illustrates another portion of the frame search circuit; and

FIG. 16 is a table of memory addresses at time of reframing.

DESCRIPTION OF THE PREFERRED EMBODIMENT

Figure 1:
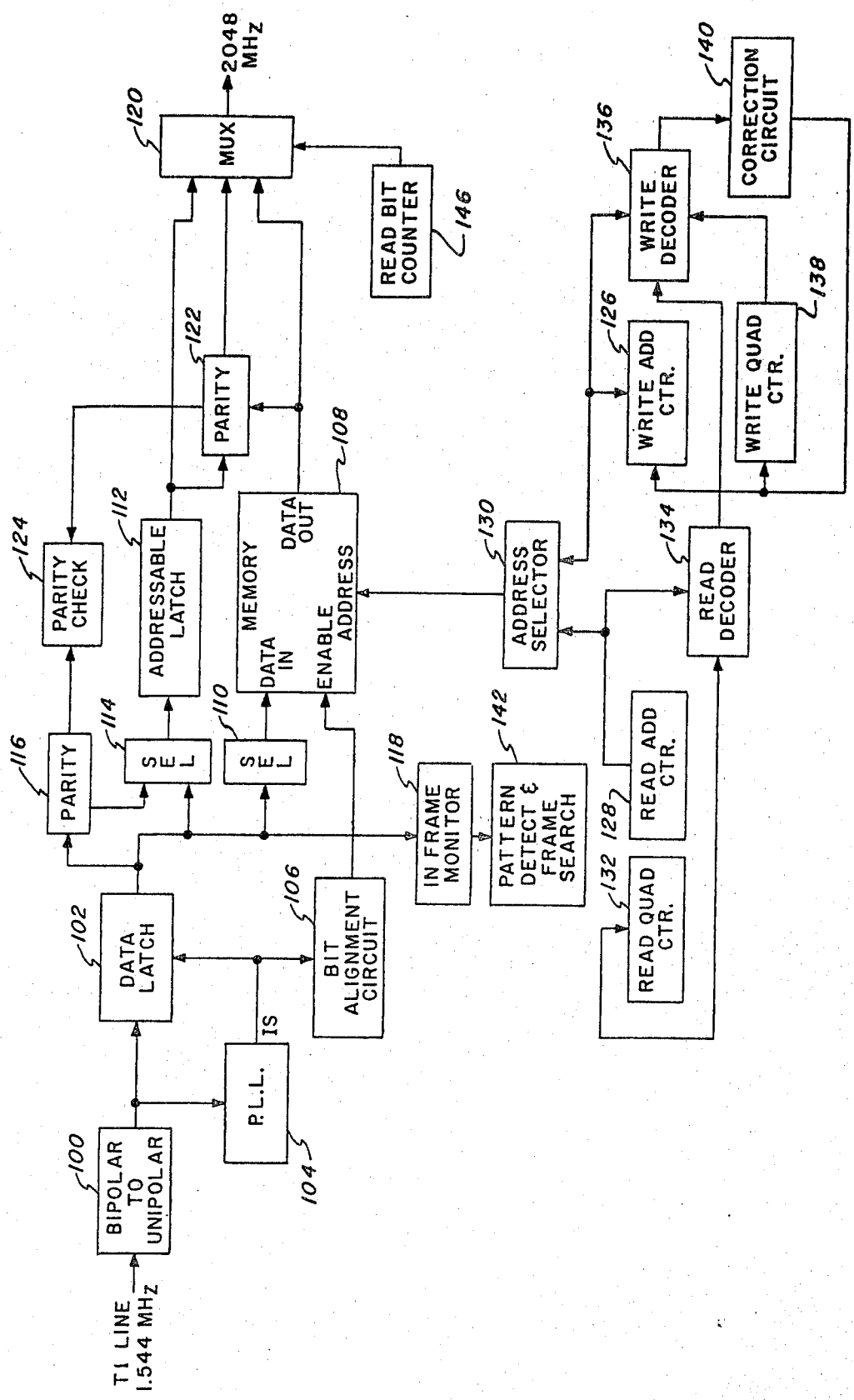
FIG. 1 illustrates in block diagram form the receive portion of a carrier terminal unit (CTU) in accordance with the invention.

The block diagram of FIG. 1 illustrates the receive portion of a Carrier Terminal Unit (CTU) which is advantageously adapted for use in interfacing T1 carrier lines to the aforementioned DSS system. The incoming T1 line is connected to a bipolar-to-unipolar converter 100 which may be of conventional design. The output of the bipolar-to-unipolar converter 100 is a 1.544 Mb/s unipolar data stream which is applied to a data latch 102 and a phase-locked loop (PLL) 104. The phase-locked loop 104 recovers the nominal 1.544 MHz carrier clock from the incoming bit stream. The output of the PLL 104 is a nominal 20 nsec pulse which is referred to as the Incoming Strobe (IS). The PLL 104 may be of conventional design. The IS signal is used to gate each incoming bit into the data latch 102 and is also applied to the bit alignment circuit 106. The bit alignment circuit 106 is used to synchronize the incoming bit and clock to the 2.048 MHz DSS clock.

The output of the data latch 102 is supplied to memory 108 via a data selector 110, to an addressable latch 112 via a data selector 114, to a parity generator 116 and to the in-frame monitor circuit 118.

At this point, it should be noted that the incoming 1.544 MHz T1 line format comprises 193 bits per frame arranged as 24 8-bit voice channels and one framing bit. The T1 line format is converted to a 2.048 MHz format of 256 bits per frame employed in DSS. The DSS format is arranged as 24 10-bit voice channels, one 10-bit common signaling channel and six "don't care" or unassigned bits. Each of the 24 10-bit voice channels comprises bits 0 through 7 which contain the incoming 8-bit voice channel, bit 8 which contains a parity bit and bit 9 which contains a signaling bit.

In addition, it should be noted that the DSS may utilize a common channel signaling arrangement described by R. E. Steidl in co-pending U.S. Patent Application, Ser. No. 805,814 filed June 13, 1977. In that arrangement, a 4 kb/s common channel is derived by untilizing the conventional D2 signaling frame identification (SFI) pattern in framing bits, $F_S$, of alternate frames for both signaling frame identification and frame synchronization and by utilizing the framing bit, $F_T$, of intermediate frames for common channel signaling.

Each voice data bit from the data latch 102 is stored in the memory 108. Signaling and framing bits are stored separately in the addressable latch 112. Parity is calculated over each incoming frame of voice data and over the signaling and framing bits of the previous two frames by the parity generator 116 and also stored in the addressable latch 112.

The read bit counter 146 controls the multiplexer 120 to provide the appropriate multiplexing of voice bits, parity and signaling information. Each 8-bit group of voice bits is read out of the memory 108 at a 2.048 MHz rate and is applied to the multiplexer 120. Parity is generated over a frame, signaling and framing bits by the parity generator 122, and compared by parity checker 124 with the parity bit stored in the addressable latch 112. The parity bit and the signaling and framing bits stored in addressable latch 112 are multiplexed with the voice data bits from memory 108 by the multiplexer 120 to produce the 2.048 DSS format described hereinabove.

The writing of incoming voice bits into the memory 108 and the reading of stored voice bits are controlled by separate write and read counter circuits 126 and 128, respectively, which are selected for connection to the address inputs of memory 108 by the memory address selector 130. A read quadrant counter 132 and a read address decoder 134 are associated with the read counter 128. A write quadrant counter 138 and a write address decoder 136 are associated with the write counter 126. As will be explained more fully hereinbelow, after each four frames of data are read from the memory 108, the relative positions of the read and write addresses are compared and if either the read or write address is overtaking the other, the correction circuit 140 will initialize the write address counter 126 and the write quadrant counter 138 at a predetermined time to provide a correction.

The in-frame monitor 118 is provided to continuously monitor the incoming framing bit to determine whether frame synchronization is present or not. If frame synchronization is lost, the framing pattern detector and frame search circuits 142 act to bring the CTU into frame synchronization. Each of the various circuits identified above will now be described in greater detail.

It should be noted that various control and timing signals are required for operation of the CTU. The generation of these signals may be provided by control and timing circuits of types well-known in the art.

BIT ALIGNMENT CIRCUIT

Figure 2:
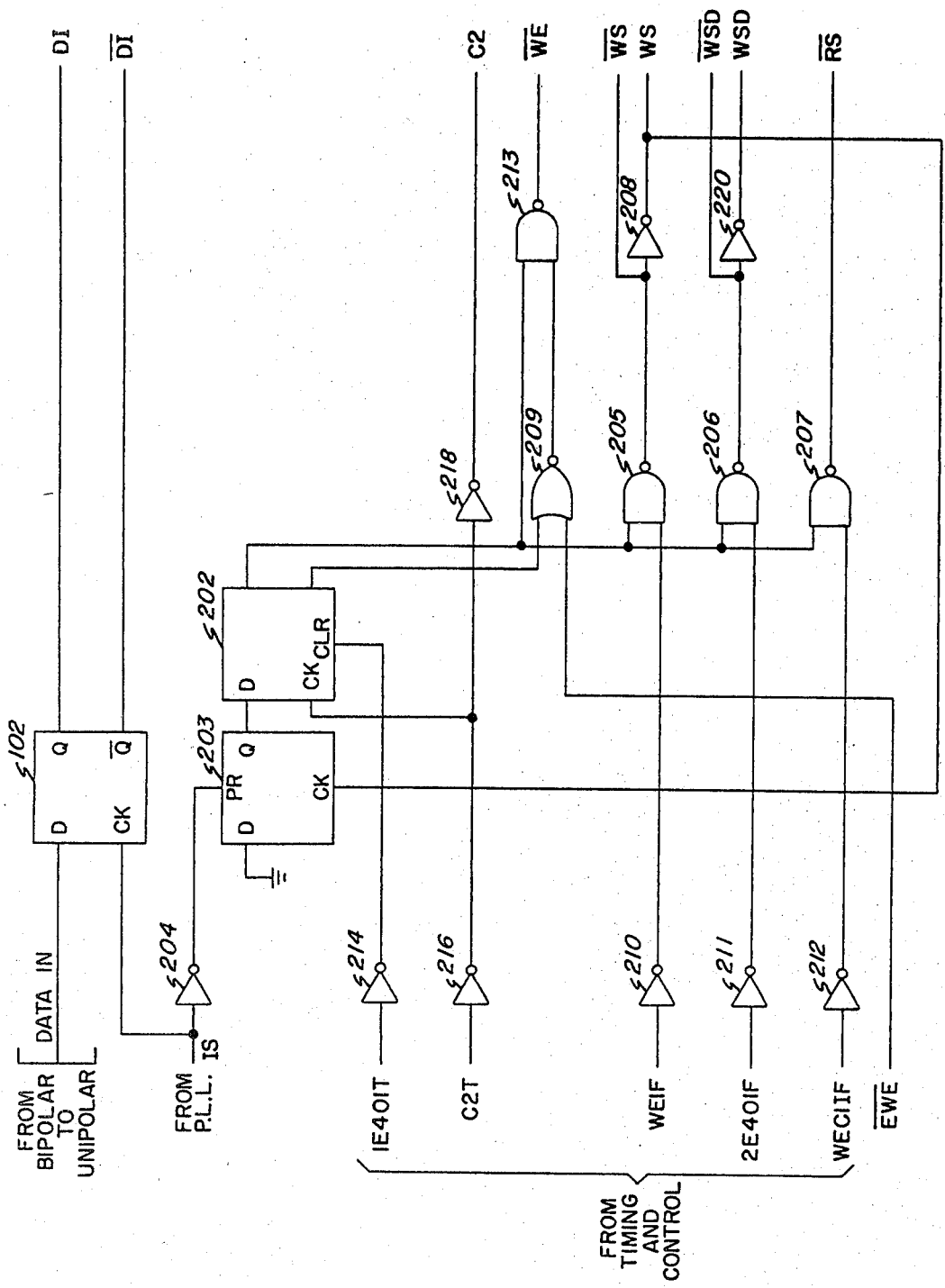
FIG. 2 illustrates a bit alignment circuit.

The bit alignment circuit 106 is used to synchronize the incoming 1.544 MHz PCM data stream with the 2.048 MHz system clock. The bit alignment circuit is illustrated in detail in FIG. 2 along with the data latch 102. Data latch 102 is a type D flip-flop having a D input connected to the output of the bipolar-to-unipolar converter 100 and its clock input, CK, connected to the strobe output of the phase-locked loop 104.

The bit alignment circuit includes an incoming data ready flip-flop 203 having a preset input PR coupled via inverter 204 to the IS output of the phase-locked loop. The Q output of flip-flop 203 is connected to the D input of an enable flip-flop 202. Enable flip-flop 202 has its clock input coupled via inverter 216 to system generated clock signal C2T.

Flip-flop 202 has a clear input CLR coupled to a system derived clock signal 1E401T via inverter 214. The Q output of flip-flop 202 is connected to one input of each 2 input nand gates 205, 206, 207. Three system derived clock signals WEIF, 2E401T and WEC1IF are respectively coupled to the second input of said nand gates 205, 206, 207 via inverters 210, 211 and 212. An inverter 208 couples the output of nand gate 205 to the clock input of flip-flop 203. A nor gate 209 has one input connected to the Q output of flip-flop 202 and a second input EWE connected to the frame search circuit which will be described in detail hereinbelow. A nand gate 213 has one input connected to the output of nor gate 209 and a second input connected to the clock source WEIF. Inverters 218 and 220 are provided to respectively provide the signals C2 and WSD for use in the other CTU circuits.

The various signal leads employed through the CTU are for convenience briefly described below in Table 1.

TABLE 1

| | |
|---|---|
| 2BIT8T | Ninth time slot of each ten bit 2.048 MHz system channel. |
| 2BIT9T | Tenth time slot of each ten bit 2.048 MHz system channel. |
| 2BOT7F | First eight time slots of each ten bit 2.048 MHz system channel. |
| 12FRJT | Twelve frame reset signal, high during last 244 nsec of a system frame through the first 244 nsec of the following frame. |
| C2T | A buffered 2.048 MHz clock. |
| CGALST | Carrier Group Alarm Strobe, 40 nsec positive strobe during the second most significant bit of each ten bit 2.048 MHz system channel. |
| COM | Control flip-flop output which indicates, when high, the normal in-frame mode with the comparisons of the in-frame monitor enabled. |
| IFE | In-Frame Error. |
| IS | Incoming Strobe, nominal 20 nsec strobe, the output of the Phase-Locked-Loop timing recovery circuit. |
| PRIEQT | Parity reversal signal from the CTC for checking the receive parity circuits, one lead per CTN. |
| RDQB0F | Least significant bit of Read Quadrant Counter. |
| RDQB1F | Most significant bit of Read Quadrant Counter. |
| RS | Read Strobe, nominally 40 nsec, used primarily during search mode to read the 256 × 1 RAM contents for comparison purposes during the frame search. |
| RSERJF | System reset, from controller. |
| READZF | Low during the last 16 system time slots of a frame. |
| SKW16F | Skewed 16 time slots, i.e., the last 6 system time slots of a frame and the first 10 system time slots of the following frame. |

TABLE 1-continued

| | |
|---|---|
| WE | Write Enable, derived from Write Strobe, below, and used to write into the 256H RAM. |
| WEIF | Timing signal, nominally 80 nsec, from which the Write strobe, below, is derived. |
| WS | Write Strobe, nominally 80 nsec, one per incoming 1.544 time slot. |
| WSD | Write Strobe Delayed, nominally 40 nsec, one after each WS, used primarily to trigger write address and mode changes. |

Figure 3:
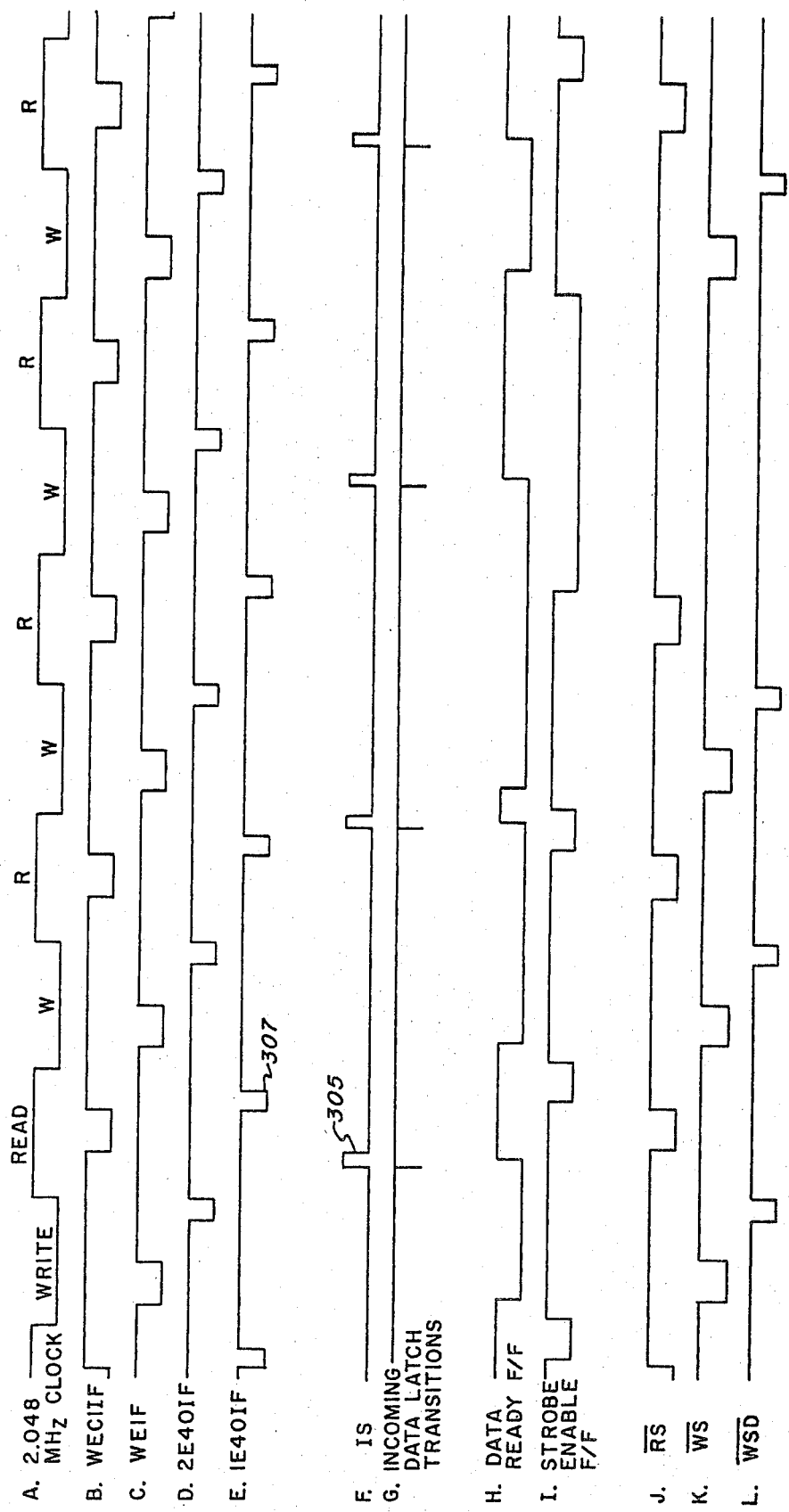
FIG. 3 is a timing diagram showing the relationship of various signals.

The operation of the bit alignment circuit may be more readily understood by reference to the timing diagrams of FIG. 3. Waveform A represents the 2.048 MHz system clock. Waveforms B, C, D and E, respectively, represent the system derived clock signals WEC-1IF, WEIF, 2E401T and 1E40IF. Waveform F represents the signal on lead 211 supplied by the phase-locked loop. Waveform G represents the incoming transitions to data latch 102. The waveforms H and I represent the states of the data ready flip-flop and strobe enable flip-flop, respectively. Waveforms J, K and L represent the output signals $\overline{RS}$, $\overline{WS}$ and $\overline{WSD}$.

Unipolar bits and the recovered bit clock strobe are received by the bit alignment circuit. The recovered bit clock incoming strobe, illustrated in waveform F, is received via line 211 from the phase-locked loop as an approximately 20 ns positive pulse 205 occurring approximately 90° or 162 ns after the leading edge of the incoming data bit. The positive edge of the recovered incoming strobe clocks the unipolar bit into flip-flop 201, therefore, at approximately its center or maximum level. Simultaneously, the incoming strobe presets the Incoming Data Ready flip-flop 203. The enable flip-flop 202 will be set by the next occurring system transition from the read phase to the write phase. The Enable flip-flop 202, having been set, will remain set until near the end of the following read phase, at which time clock 1E4OIF will apply a pulse 307, occurring from 160 to 200 ns, into the read phase to the clear input of flip-flop 202. While Enable flip-flop 202 is set, one write strobe (WS) used for memory writing, one write strobe delayed (WSD) for memory address changing and one read strobe (RS) for reading an addressed memory location will be produced by enabling nand gates 205, 206 and 207.

At least one and possibly two Write Strobes could occur after one incoming bit is latched in the data flip-flop 201 but before the next incoming bit is latched. If there were two Write Strobes, there would be one memory address change strobe between the two so if both Write Strobes were allowed before the next data bit is latched, the same data bit would be written into two addresses. Therefore, once a single write Strobe is enabled, following the latching of an incoming bit, the Data Read flip-flop 203 is clocked by the leading edge of the enabled Write Strobe (WS) back to its original state, so that the following transition from read phase to write phase will not be recognized unless it occurs after the next incoming bit is latched, meaning the next bit is available. As a result, there will be one and only one Write Strobe enabled between every two incoming data bits being latched. Also, the address will change due to one and only one Write Strobe Delayed, only after the enabled Write Strobe occurs but which may occur either before or after the next incoming bit is latched. The one and only one Read Strobe per incoming bit may also occur either before or after that same incoming bit is latched.

For the DSS switching function, each system time slot is composed of two halves, a first or read half and the second or write half. The order of operations within a time slot is then read, write, memory address change; read, write, memory address change, etc.

The read operations take place at several average rates depending on the section of the circuit doing the reading. Reading, in the present context, means retrieving, examining or transferring data previously having been written into the Carrier Terminal receive section. This is done by the multiplexer 120 at a 2.048 MHz rate, by the framing circuit 142 during a reframe search at a 1.544 MHz rate, and by the receive side parity circuitry 116 at a 8 KHz rate.

The write operation takes place at the T1 line 1.544 MHz rate and involves temporarily storing data from the T1 line into storage cells of memory 108.

The address change operation takes place at several average rates depending on the section of the circuit doing the address changing. Read addressing takes place at the 2.048 MHz rate, whereas write addressing takes place at the T1 line 1.544 MHz average rate.

To prevent infinitesimally small glitch outputs from the bit aligner circuit (always a possibility when two completely asynchronous signals are fed to a practical logic circuit without some type of filtering), the bit aligner circuit makes use of timing filter action. All timing signals which are gated by the Enable flip-flop 202, and which generate the timing outputs of the bit aligner, are at least 40 ns removed from the read to write transitions which are used to clock the Enable flip-flop 202. Therefore, no gated outputs can result from asynchronously caused glitches on the output of the Enable flip-flop 202. Also, flip-flop 201, which is set by the Incoming Strobe, which is asynchronous with the office timing, and whose only other input is the office timing signal, Write Strobe, whose leading positive edge causes transitions, has these two signals separated in time by at least 40 nsec minus the incoming strobe width in nanoseconds. The Incoming Strobe IS must be of short enough duration such that the setup time of the flip-flop 203 is met between the end of the Incoming Strobe IS and the rising edge of the Write Strobe WS which clocks the first flip-flop back to the incoming state. IS must be nevertheless be long enough to operate the clock input of the data latch 201, the preset input of the Incoming/Data Ready flip-flop 203, and to apply a reset signal to the phase-locked loop control circuitry.

Since there are several operations, read, write, and address change, associated with each incoming bit, a necessity is apparent for multiple phases or an equivalent timing scheme to operate the CTU. There are more lines of communication between the CTU and the 2.048 MHz system than between the CTU and the 1.544 MHz line and there are already available multiple 2.048 MHz signals which can be common to more than one CTU unit. For these reasons, and because synchronous operation is easier than asynchronous operation, it was chosen to operate as much as possible of the CTU synchronously with the 2.048 MHz clock rather than with the 1.544 MHz clock. As a result of this, the number of components which must receive asynchronous inputs is limited to the two flip-flops, the Incoming/Data Ready flip-flop 203 and the strobe Enable flip-flop 202. All CTU receive hardware on the line side of these flip-flops operate synchronously with the line 1.544 MHz rate and all remaining CTU receive hardware operates synchronously with the 2.048 MHz.

According to FIG. 3, the 2.048 MHz system clock has two phases, R or the read phase, and W or the write phase. The addresses change at the transition from the write phase to the read phase. To understand the operation of the bit alignment circuit, from the following discussion, refer to the timing diagram of FIG. 3. This diagram is drawn to indicate a worst case condition, in that the Incoming Strobe occurs at a time just too late to allow the next occurring Write Strobe to operate. In this case, the bit can only be successfully written if another Write Strobe can occur to write the bit before another incoming bit and strobe arrive. Considering typical propagation delays, the data will be latched at approximately 6 ns after the leading Incoming Strobe edge. The Incoming/Data Ready flip-flop will be set after 7 ns. As the result of the assumed conditions, a wait of 488 ns for the Enable flip-flop must take place before the next occurring system change from read to write can set the Enable flip-flop which would be set at an elapsed time of 501 ns after the leading edge of the Incoming Strobe. The enable Write Strobe (WE) would then occur from 544 ns to 624 ns, ending a safe distance from the 654 ns at which the data will next change, a safety factor of 30 ns. For the opposite case, i.e., the case in which the Incoming Strobe occurs just early enough to allow the next WS strobe, it will be used and the next one will be dropped. Again, the data latch output will be ready at 6 ns, the Incoming/Data Ready flip-flop will be set at 7 ns, and assuming a 5 ns setup time for the Enable flip-flop, the Enable flip-flop will be set at 18 ns. The enabled Write Strobe will then occur from 61 ns to 141 ns, writing the data which became stable at 6 ns, a safety factor of 55 ns. These safety factors are mismatched intentionally to account for delays introduced by the logic elements.

RATE AND FORMAT CONVERSION

The standard incoming 1.544 MHz T1 line format of 193 bits per frame, comprising 24 8-bit voice channels and one framing bit must be converted to the 2.048 MHz system format of 256 bits per frame comprising 24 10-bit voice channels, one 10-bit common signaling channel and six "don't care" bits. Each of the 24 10-bit voice channels comprises the incoming 8-bit voice channel, a parity bit and a signaling bit. The 10-bit common signaling channel is used for communication between the central control of the switching system and a remote line switch.

Figure 4:
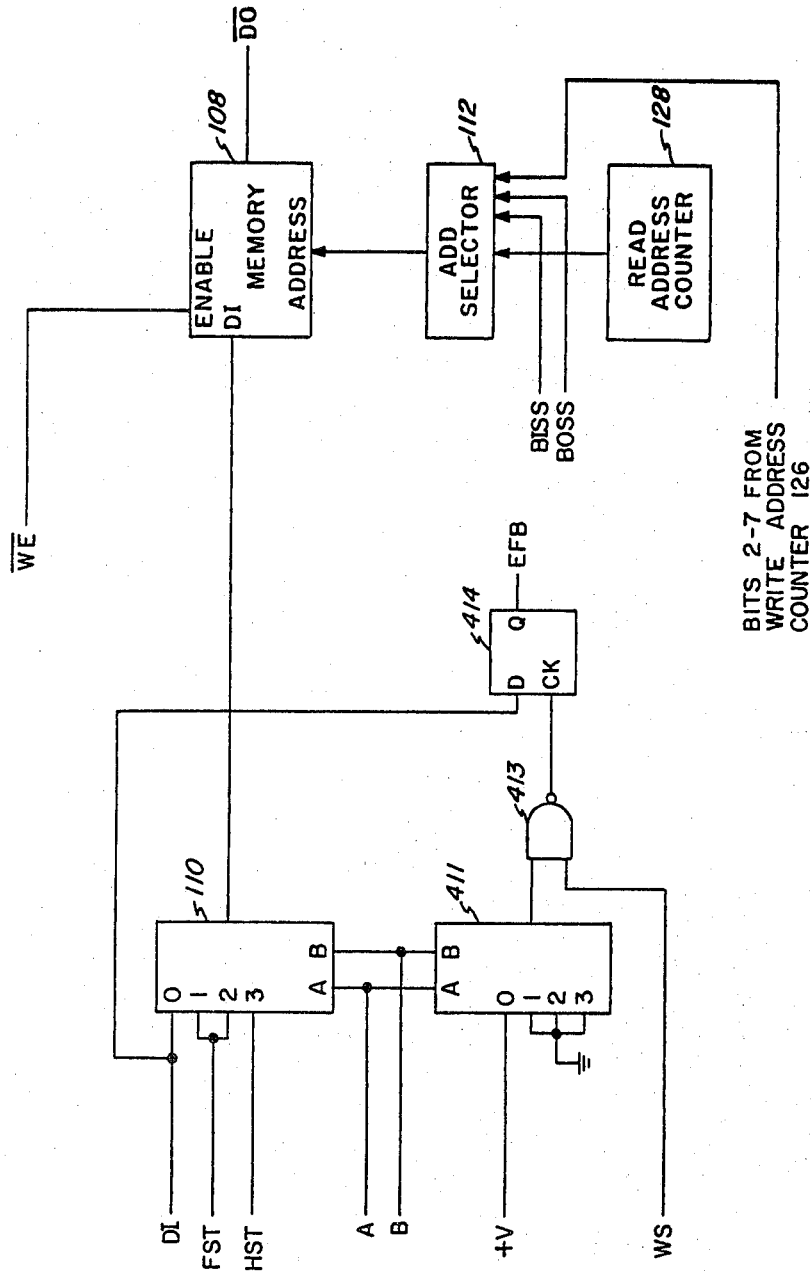
FIG. 4 illustrates the memory portion of the CTU.

The rate and format conversion will now be described, in general, with reference to the diagram of FIG. 4. For this description, it is assumed that the Carrier Terminal Unit is operating in an in-frame mode.

Incoming serial data is transmitted from the data latch 102 to a selector circuit 110. The address inputs A and B to the selection are maintained in a state such that the serial data is transmitted to the data-in terminal DI of the memory 108. Memory 108 is a random access memory (RAM) having 256 addressable locations, each location containing one memory cell, and accordingly, may be referred to as a 256×1 RAM. A WE strobe signal is transmitted from the bit alignment circuit 106 to the memory 108 for each data bit originated by data latch 105. Memory location write addresses are supplied to the memory 108 by a write address counter 126 via address selector 112. The write address counter 126 is incremented by the write strobe delayed (WSD) signal from the bit alignment circuit 106 after each incoming voice bit is written into the memory 108. The 192 successive voice bits of a frame are sequentially stored in 192 successive memory locations of the memory 108.

The 193rd bit of each frame is a signaling or framing bit. With reference now to FIG. 1, after the 193rd bit, the write address counter 126 is not incremented. Instead, a write quadrant counter 138 is incremented after the 193rd bit of each frame. The signaling or framing bit is transmitted via selector 114 to an addressable latch 112, wherein it is stored. The write quadrant counter 138 serves to indicate a group of 192 address location in the memory 108 which will receive the 192 voice bits of a particular incoming frame and also the location of the cell in addressable latch 112 which will receive the 193rd bit of that frame.

The write quadrant counter 138 identifies four unique but overlapping groups of address locations in the memory 108 for the 192 voice bits of each frame. In the normal in-frame state considered here, memory addressing is obtained by incrementing the write address counter 126 after each voice bit is written including the overflow count of address 255 to address 000. The four groups of address locations are referred to herein as write quuadrants. For write quadrant 1, 192 voice bits are stored in address locations 0 through 191; for write quadrant 2, the voice bits are stored sequentially beginning at address location 192, continue through to address 255, then to address 0 and through to address location 127; for write quadrant 3, voice bits are stored beginning in address location 128 and continuing through address 255, then to address 0 and through address 63; for write quadrant 4, voice bits are stored beginning at address 64 and through address 255.

With the four quadrant structured operation, four addresses will indicate the 193rd bit position of frames. These addresses are: quadrant 1 and memory address 192; quadrant 2 and memory address 128; quadrant 3 and memory address 64; and quadrant 4 and memory address 0. Decoder circuit 114 generates a signal whenever any of the four addresses occurs. This signal is utilized for controlling storing information in the addressable latch, framing bit checking, incoming parity generation and storage, counter control and delay equalization correction. Four bits of the 8-bit addressable latch 112 are used to store signaling and framing bits. The remaining 4-bits are used to temporarily store generated incoming receive parity for further use by a receive parity circuitry.

Figure 5:
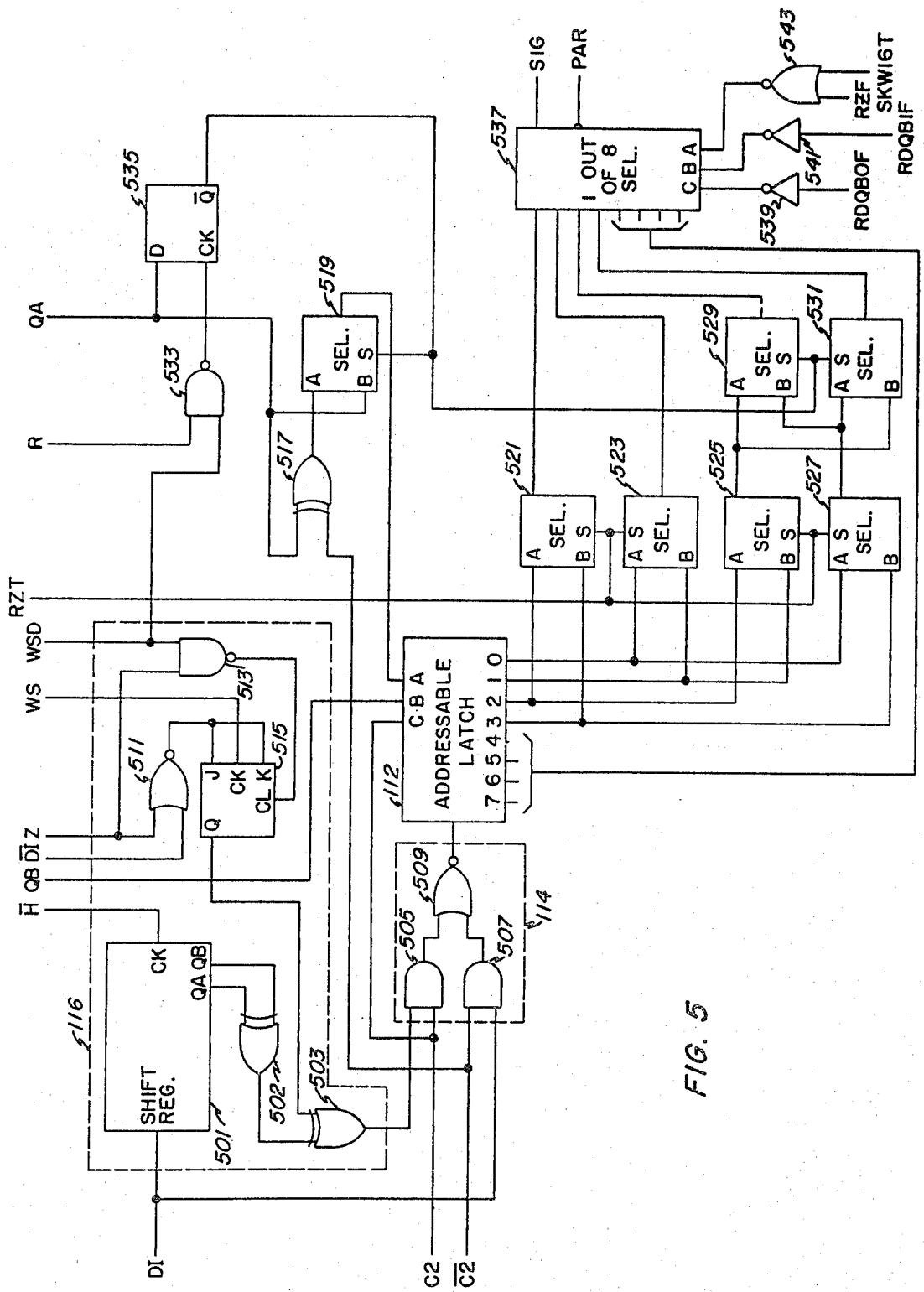
FIG. 5 illustrates a receive parity circuit, addressable latch and associated circuitry.

Receive parity is checked in the Carrier Terminal Unit on a one frame cycle basis. As the 192 voice bits of a frame are entered into the memory 108, the are also fed to the receive parity generator 116. The parity generator circuit 116, shown in FIG. 5, includes a flip-flop 515 which is toggled for each voice bit having a logic on-state. The flip-flop 515 is controlled by gates 511 and 513.

Each signaling or framing bit is stored in a signaling shift register 501 concurrently with storage in the addressable latch 112. During the incoming 193rd signaling or framing bit period, the output of the parity generating flip-flop 515 and the signaling and framing bits from the previous two frames are read from the signaling shift register 501 and are exclusive oRed by gates 502 and 503 to form a parity bit calculated over the 192 voice bits in a frame and the 193rd bit of the two previous frames. This parity bit is stored in the addressable latch 112. The memory locations in the addressable latch 112, wherein information is stored, is determined by the QB and C2 signals and either the exclusive oR of the QA and C2 signals provided by exclusive oR gate 517 and 1-out-of 2 selector 519. The four signaling information location outputs of the addressable latch, i.e., 0-3 are applied to a transpose circuit comprising 1-out-of 2 selectors 521, 523, 525, 527, 529 and 531 which are controlled by nand gate 533 and flip-flop 535 such that for the first 24 channels of a system read, the signaling bits for two alternate frames will be provied to the inputs of the 1-out-of 8 selector 537, whereas in the 25th channel, the common channel signaling bit will be provided. The 1-out-of 8 selector 537 under control of signals RDQBOF, RDQB1F, RZF and SKW16T via gates 539, 541 and 543 selects which parity and signaling or common channel bits will be transmitted to output multiplexer 128. For parity, the inverting output of the selector 537 is employed.

Flip-flop 535 controls selector 519 to determine whether the low order address bit, A, of the adressable latch 112, is to be inverted or not, which in turn, determines whether a signaling frame identification SFI bit will be stored in an odd or even location on addressable latch 112. As will be explained hereinbelow, at the time of reframing or at initialization, the write quadrant counter is initialized to place the write address vector between 1/6 and 1 1/6 frames ahead of the read address vector. If after initialization, the write address vector is in quadrant 1 or 3, the SFI bits are stored in even quadrants. If after initialization, the write vector is in quadrant 2 or 4, the SFI bits are stored in odd quadrants.

To provide information to the switching system, the voice bits stored in the memory 108, the signaling and information bits stored in addressable latch 112 and parity must be properly multiplexed. During the read phase of the system clock, the address selector 130 permits the read address counter 128 to supply addresses to the memory 108. The read address counter 128 counts from 0 to 255 and then recycles to a count of 0 on the next clock cycle. The read address counter 128 is arranged such that it counts for eight 2.048 MHz system clock cycles and then is inhibited for two clock cycles, counts eight clock cycles and stops for two clock cycles, etc, until 240 clock cycles have occurred. The counter 128 thus remains unchanged for 16 clock cycles. This interrupted counting sequence is then repeated for every 256 clock cycles.

A read bit counter 146 counts from 0 to 9 twenty four times and then from 0 to 15 once while the read address counter 128 counts through the above-described interrupted counting sequence.

The read bit counter 146 generates signals for identifying the eight voice bit time slots of each 10-bit channel, the 9th time slot and the 10th time slot. These signals are applied to the multiplexer 120. Starting with the beginning of a frame, eight voice bits are read from memory 108 and gated through multiplexer 120 to the switching system. Parity generator 122 generates an odd parity bit over these eight voice bits and over a framing bit obtained from the addressable latch 110.

During the 9th time slot of the ten time slots of each system channel as determined by the read bit counter 146, the generated parity bit is selected by the mulitplexer 120 for transmission. During the 10th slot of each system channel, again as determined by the read bit counter 146, the multiplexer gates a framing bit from the addressable latch 112 to the switching system. This process repeats for twenty-four 10-bit channels. For the next eight bits, logic "O's" are transmitted through the multiplexer. A parity bit is generated over the eight logic "O's" and a common channel signaling bit read from the addressable latch 112. The parity bit is transmitted after the eight "O's" and is followed by the common channel bit. Then, six logic "O's" are transmitted to complete the 256 bit system frame.

The framing bit which is transmitted as the 10th bit of each 24 channels is the framing bit which came in either the first or second incoming frame preceeding the frame being transmitted to the switching system. The common channel bit which is transmitted is similarly obtained from the first or second preceeding incoming frame.

DELAY VARIATION EQUALIZATION

The memory 108, in addition to being an integral part of the rate and format conversion arrangement, operates as an elastic store for delay variations. With phase delays, the distance between the memory address being read and the memory address being written will vary. Where delay variations become excessive, the memory 108 will not have sufficient capacity to provide compensation and certain corrective actions must be taken.

If the delay increases or decreases approximately 32 bits in either direction following the most recent reframe, an overtaking of the read addresses by the write addresses or vice versa could take place absent corrective action. Associated with the memory 108 is circuitry which periodically checks the relative distances between the read and write addresses and shortly after an overtaking condition is approached, a correction is applied.

To minimize hardware while still achieving satisfactory performance, the address distances are checked once every four frames as determined by a decode of the memory read address counters. If a correction is necessary, as determined by the check, a latch is set and the correction is applied at a particular selected write address. By making use of a threshold region of forbidden write addresses at the time of the address check and by knowing the maximum drift rate between the two address counter rates, a forbidden threshold range can be chosen wide enough so that given the maximum drift rate the correction can always be applied so that no overlap occurs. The correction applied for this purpose is the delay equalization correction. A correction can also occur whenever the write address counter if found to be more than 1⅛ frames ahead of the read counter. Whenever this occurs while the system is in-frame, a correction or more than one correction will be applied to reduce the distance to the allowed range. This correction is called the continuous compare correction. If this correction was not provided, a stable state could exist, wherein information to the system would not be in frame alignment and although a parity alarm would be indicated, no automatic corrective action would take place. The total allowed range of the write counter at the time of checking is limited to 1⅛ frames minus the two threshold regions covered in the cases below.

The time of checking, which is determined by the system read address counters, was chosen in an effort to simplify as much as possible the decode of the write address counter.

There are two cases where delay variation equalization corrections are required. One case is where an increase in the long term incoming information rate causes the memory write address to approach overtaking the memory read addresses. The other case is where the long term incoming information rate has caused the write addresses to fall back towards the read addresses and an overtaking condition is being approached.

The relationship between the read and write addresses under various conditions may be better understood by referring to FIGS. 6a–h.

FIGS. 6a–g illustrate the relationship between the read and write addresses in phasor diagram form. The read and write addresses are represented as phasors which rotate clockwise through increasing memory addresses. One 360° rotation corresponds to the 256 memory locations (addresses 0 to 255).

Figure 6A:
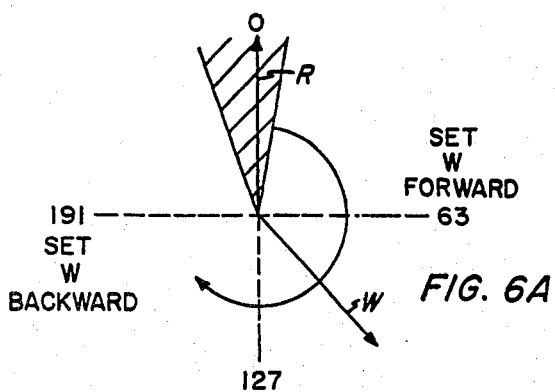
FIGS. 6a–g illustrate in phasor diagram form the relationship between memory read and write address.

FIG. 6a illustrates the normal relationship between the read and write addresses, wherein the write address is positioned ahead of the read address. There further is a normal variation D between the read and write addresses. Although both vectors will rotate of a 2.048 MHz rate, the write vector will increment at an almost constant rate for 192 counts out of 256 and stop for one incoming time slot at the end of a frame, whereas the read address will increment in a more complex start-/stop routine. The read address will increment for eight time slots, stop for two time slots, repeating this sequence 24 times, then halt for 16 time slots at the end of a system frame. It can be appreciated that there will be a varying relationship between the read and write addresses from these effects alone. For example, near the end of a system frame, the read address will stop for 18 consecutive time slots while during the same time interval the write address may increment almost uniformly through approximately twelve or thirteen consecutive addresses. As long as D does not approach zero, there will be no need for delay equalization corrections.

Figure 6B:
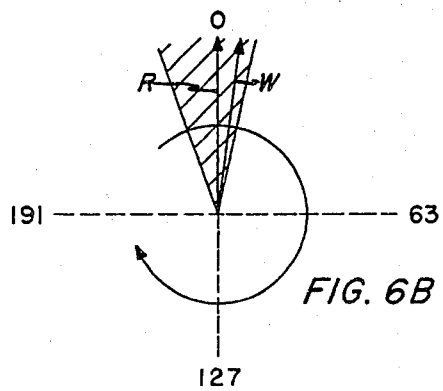
Figure 6E:
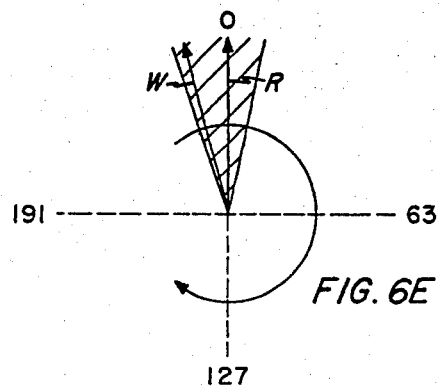
Figure 6C:
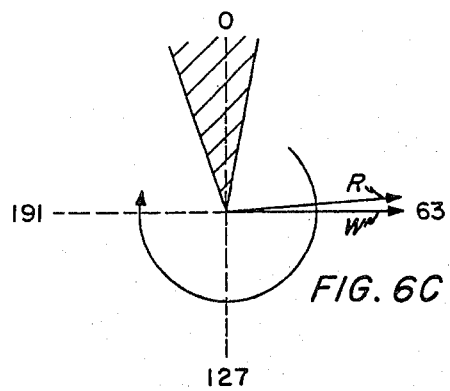
Figure 6F:
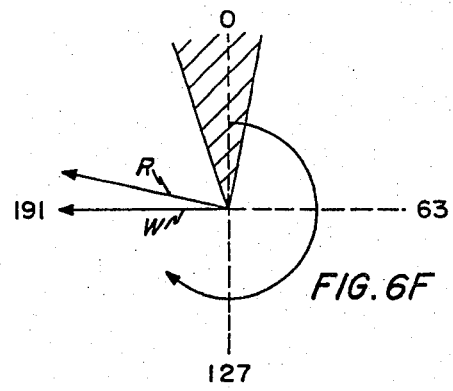
Figure 6D:
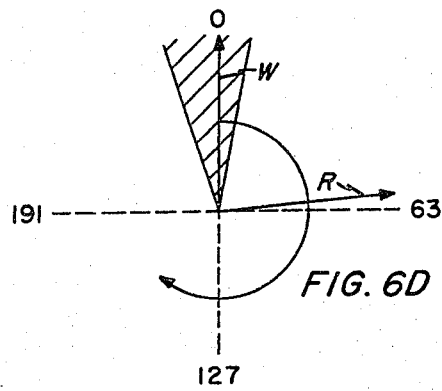
Figure 6G:
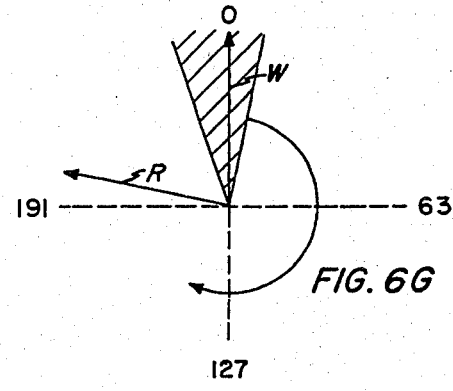
Figure 6H:
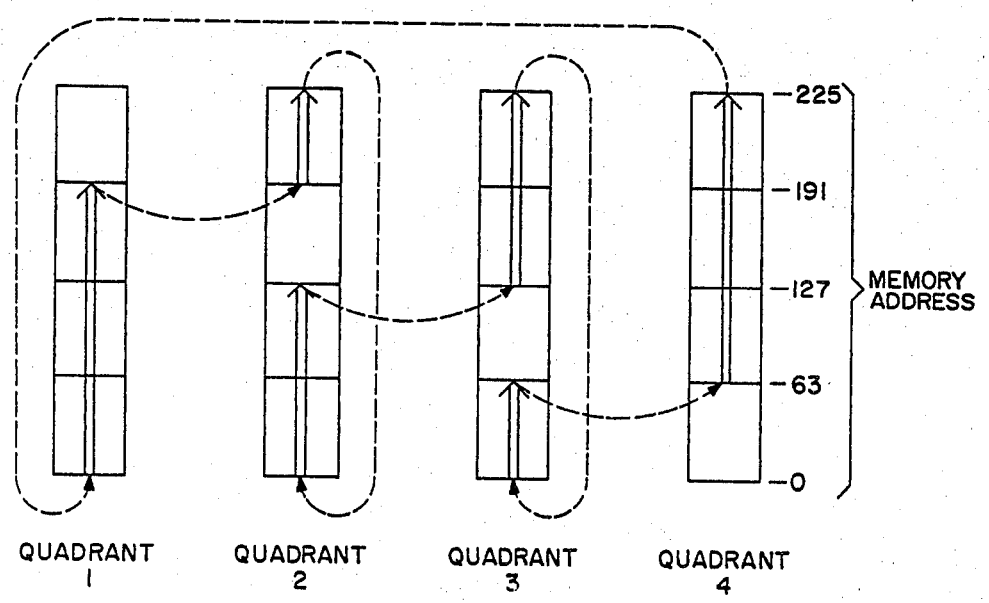
FIG. 6h is a memory map for four frames of data.

FIG. 6h is a memory map of four consecutive frames of voice data in accordance with the four quadrant techniques deescribed hereinabove. Incoming voice bit are stored consecutively in memory address locations 0 through 191 and the write quadrant counter indicates quadrant 1. Incoming voice bits of a second frame are stored consecutively in address locations 192 through 255 and 0 through 127 and the write quadrant counter indicates quadrant 2. Incoming voice bits of a third frame are stored consecutively in address locations 127 through 255 and 0 through 63 and the write quadrant indicates quadrant 3. Incoming voice bits of a fourth frame are stored consecutively in address locations 63 though 255 and the write quadrant counter indicates quadrant 4.

The decision point at which it will be determined whether a correction is necessary is after read memory address 255, quadrant 4. If when the read address is at the decision point, the write address is more than 1⅛ frames (256 bits, the length of memory 108 is 1⅛ frames) ahead of the read address or if the write address is within a prohibited zone ahead of the read address then a correction will be provided.

This operation will now be described generally with reference to FIGS. 6b–g and then in greater detail.

In FIG. 6b the read vector R is at memory address 255, quadrant 4. The write vector W has slowed down relative to the read vector and is within a prohibited zone P. This condition is stored until the write vector is at the end of the third quadrant following the decision point, the read and write vectors have the relative positions shown in FIG. 6c. A forward correction of the write address is then obtained by initializing the memory write address counter and write quadrant counter such that the next write address is the first address of the first quadrant, i.e., memory address 0 as shown in FIG. 6d. As a result of the correction, approximately one frame of old data, i.e., quadrant 4 will be read without having been changed from the previous reading.

In FIG. 6e the read vector R is again shown at the decision point, memory address 255 in quadrant 4. The write vector W has speeded up relative to the read vector R and is within the prohibited zone P. This condition is stored. When the write vector is at the end of the first quadrant, following the decision point, the read and write vectors have the relative positions shown in FIG. 6f. A backward correction of the write address is then obtained by initializing the memory write address and quadrant counters such that the next write address is memory address 0, write quadrant 1 as shown in FIG. 6g. As a result of this correction, approximately one form of old data will be overwritten before it is read.

In the first case, when the write address is approaching the read address, it is convenient to consider the conditions near the time that the read address represents time slot 241. At this time, the read or system frame has ended with respect to voice bit and read addresses are not incrementing Since for this case, the write addresses are approaching the read address, not only is the write address incrementing rather smoothly except for the 193rd bit, but also it is approaching the end of the first third of quadrant 2. This is because the write address must always be considered as ahead of the read address, but not more than $1\frac{1}{3}$ frame ahead. Now address 255 of the 256×1 RAM was read by the system during time slot 237 and address 0 will be read during the following time slot 0. Eventhough the system 2.048 MHz read rate is interruped for two time slots after every eight time slots, it still reads at a faster rate than the incoming 1.544 MHz rate during the first 240 time slots of a frame. This is apparent if it is recalled that each 10-bit system channel uses 4.88 microseconds while each eight-bit T1 line channel uses 5.18 $\mu$s. This means that once the system begins to read in the next time slot 0, if the write address had not overtaken the read address while the read address was interrupted, then there is no danger of an overtaking occurring until at least the same conditions are met one frame later. Because there is a delay of four frames until the next address check and because there is also a delay from the time of checking until the time a correction is applied, a safety factor is added to the threshold region to allow for continued delay variation in the same direction during these delays to a correction. At the time of a check, if the write address is found in the threshold region of write quadrant 2, write addresses 240, 255, then a backward correction flip-flop will be set to prepare the CTU at the end of the next write quadrant 1, address 192 to set its write quadrant counter and write address counter back one frame to write quadrant 1, address 0 thus increasing the numerical distance between the read and write addresses.

As an example of this first case, consider that the write address counter has drifted so that at the time of the check, i.e., when the read quadrant counter and read bit counter from the CTU indicates read quadrant 4, last 16-bits and read bit counter 1, after having read the location of address 255, the write address is at write quadrant 2, address 241. Then when the read address counter again begins to read address 0 in the next time slot 0, fourteen system time slots after the check, the write address counter, assuming no more drift since the time of checking, will be writing in RAM address 252.

An incoming voice bit will not be written into address 0 until the read address counter contains address 6. This shows that the write counter has not overtaken the read counter and that there is no danger of it happening unless the delay drift continues. Nevertheless the proximity of the two addresses indicates that, were the drift to continue and no correction applied, an overtaking condition is imminent. A correction is therefore applied as stated earlier.

In the second case, when the write address is falling back toward the read adddress, it is again convenient to consider the conditions near the time that the read address represents time slot 241. At this time, the reading of system frame has ended with respect to voice and the read addresses are not changing. Again, the write address counter is incrementing, as usual, but this time it is temporarily widening the gap between the write address and the read counter address by proceeding into write quadrant 1 while the read address is not changing. After the system read addresses again begin to change in the next system time slot 0, if the read address will not overtake the write address in the next frame just before the read address again stops incrementing at the end of the frame, then an overtaking of the write address will not occur. Because there is a delay of four frames until the next address check and because there is also a delay from the time of checking until the time a correction is applied, a safety factor is added to the threshold region to allow for continued delay variation or equivalent delay variation in the same direction during these delays to a correction. At the time of a check, if the write address is found in the threshold region of write quadrant 1, write address 0 through 7, then a forward correction flip-flop will be set. After the following write quadrant 3, address 64, the write quadrant counter and write address counters are advanced forward one frame to write quadrant 1, address 0, thus increasing the numerical distance between the read and write addresses.

As an example of the second case, consider that the write address counter has drifted so that at the time of the check, i.e., the write address is at write quadrant 1, address 6. When the read address counter again begins to read at RAM address 0 in the next time slot 0, fourteen system time slots after the check, the write address counter, assuming no more drift from the time of checking, will be writing in RAM address 17, the arithmetic difference between the read and write address will gradually decrease during the next frame until near the end of the frame when the read address reads the last bit of the frame at write quadrant 1, address 191, in system time slot 237. At this time, the write address counter, assuming no more drift from the time of checking, will be writing in address 195. Thus, the read counter has not overtaken the write counter and that there is no danger of it happening unless the delay drift continues. Nevertheless the proximity of the two addresses indicates that, were the drift to continue and there were no correction applied, that an overtaking condition is imminent. The correction is then applied as stated earlier.

Figure 7:
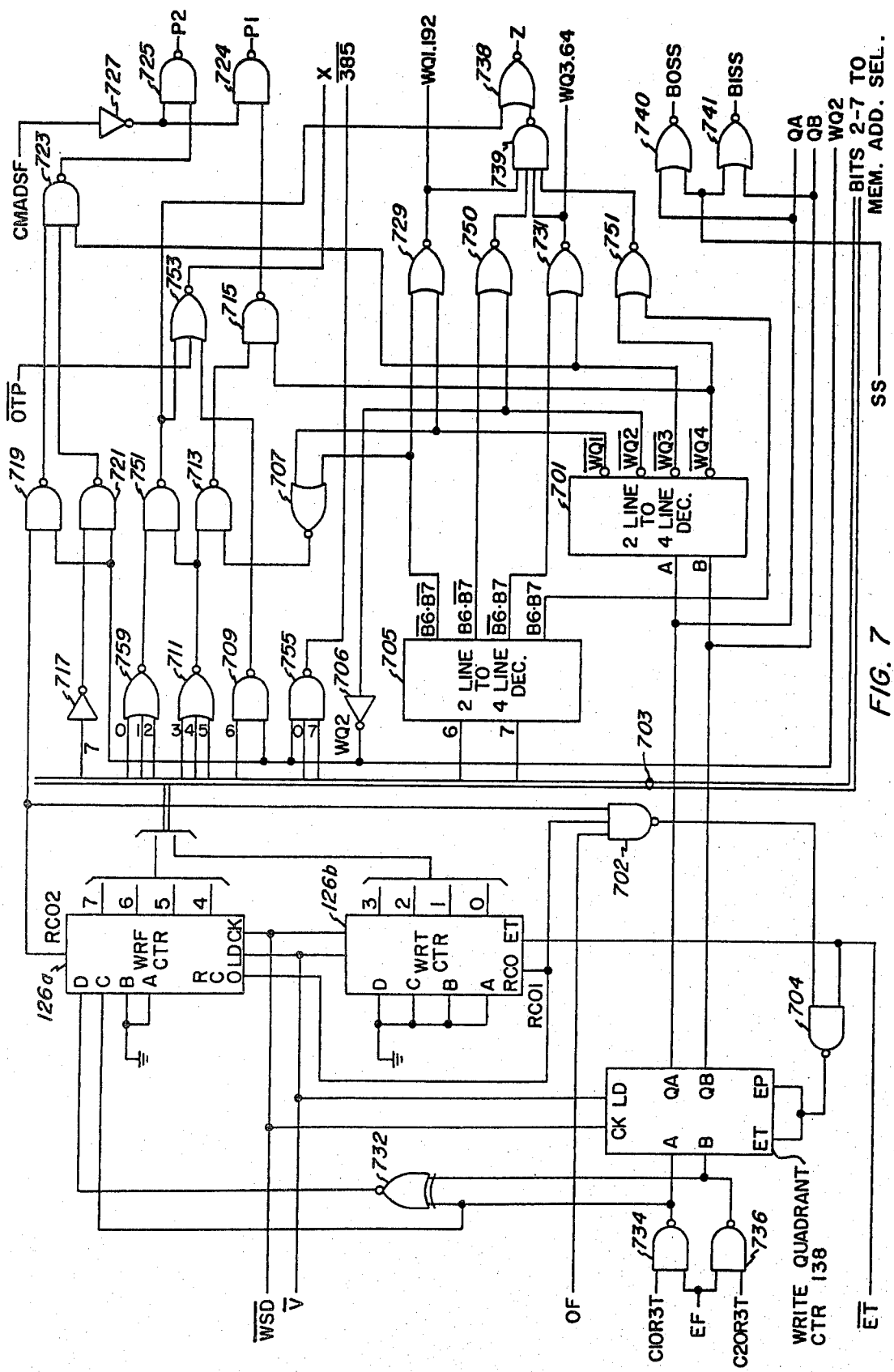
FIG. 7 illustrates the write address counter, write quadrant counter and decoding circuitry.

FIG. 7 illustrates the write address counter, the write quadrant counter and decoder circuitry which is used to provide delay equalization. The write address counter comprises two four-bit counters 126a and 126b connected to provide an 8-bit counter. The write quadrant counter 138 is a 2-bit counter having its two outputs QA and QB connected to a 2-line to 4-line demultiplexer 701 which decodes the counter 138 outputs into the signals WQ1, WQ2, WQ3 and WQ4 which represent each of the four write quadrants. The counters 126a, 126b and 138 are coupled by gates 702 and 704. The eight outputs of the write address counters 126a and 126b are coupled to an eight-bit parallel bus 703.

For purposes of clarity, each counter bit has been identified as 0-7 and the various connections from the bus 703 to the address decoding circuit are identified with the number of the corresponding counter bit.

A 2-line to 4-line circuit 705 is connected to bits b6 and b7 of the write counter. Inverter 706, gates 707, 709, 711, 713 and 715 continuously decode the output of the write counters 126a and 126b and the write quadrant counter 138. Each time the counters 126a, 126b and 138 are within the prohibited range of addresses ahead of the aforementioned decision point, the gate 715 will generate a signal.

Inverters 706 and 717 and gates 719, 721 and 723 also continuously decode the output of the write counters 126a, 126b and 138. Each time the counters 126a, 126b and 138 are within the prohibited range of addresses behind the decision point, the gate 723 will generate a signal. When the read address counter and read quadrant counter are at the decision point, a signal CMADSF is applied to gates 724 and 725 via inverter 727. If when the signal CMADSF is present, the gate 715 indicates that the write adess is within the forbidden zone, gate 724 will produce a signal P1 indicating that a forward correction is to be made. If when signal CMADSF is present, the gate 724 indicates that the write address is within the forbidden zone, gate 725 will produce a signal P2 indicating that a backward correction is to be made. The gates 729 and 731 respectively decode the counter outputs to provide signals that respectively indicate when write quadrant 1, address 192, WQ1.192 and write quadrant 3, address 64, WQ3.64 are reached.

Figure 8:
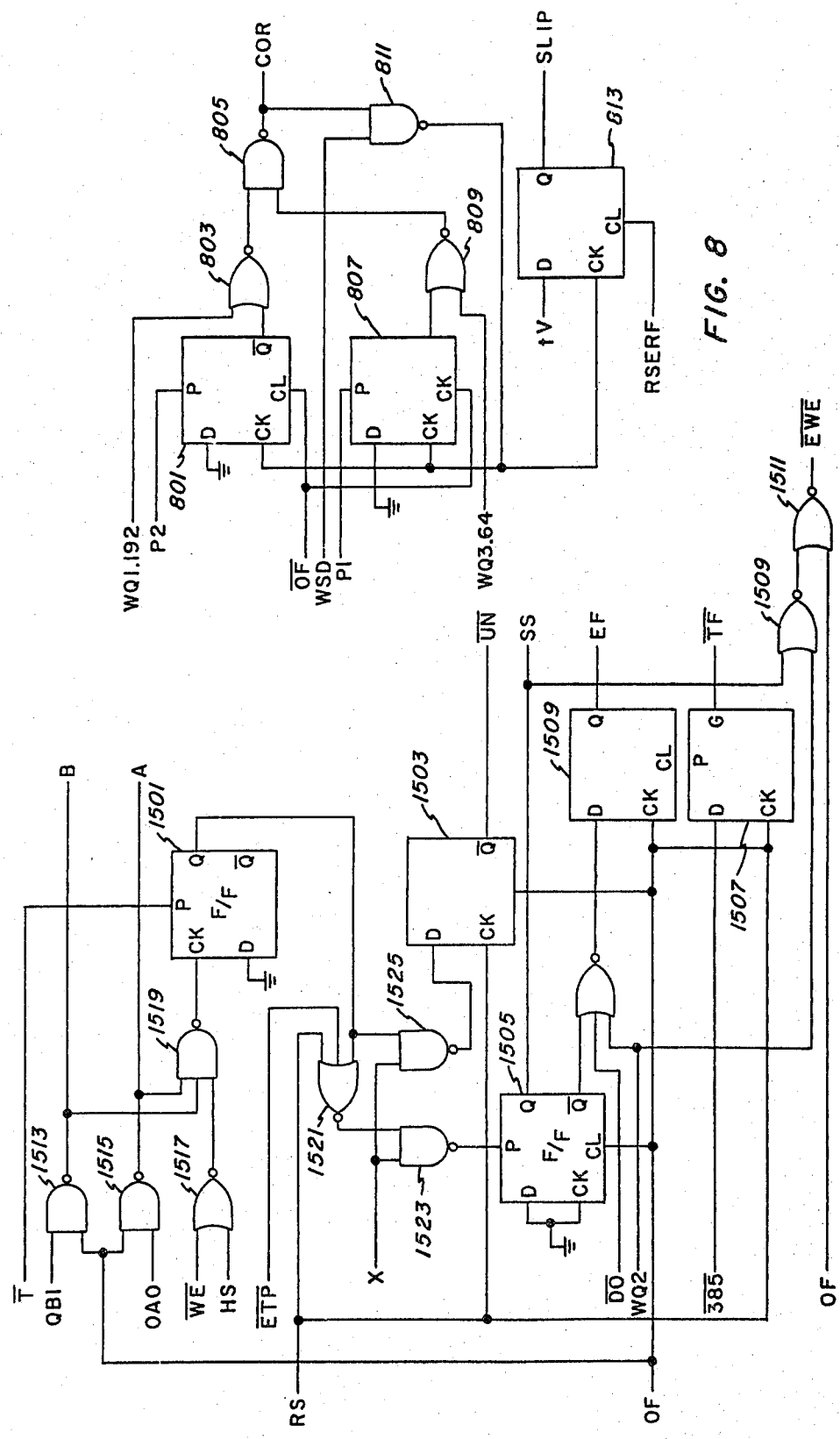
FIG. 8 illustrates a delay equalization circuit.
Figure 9:
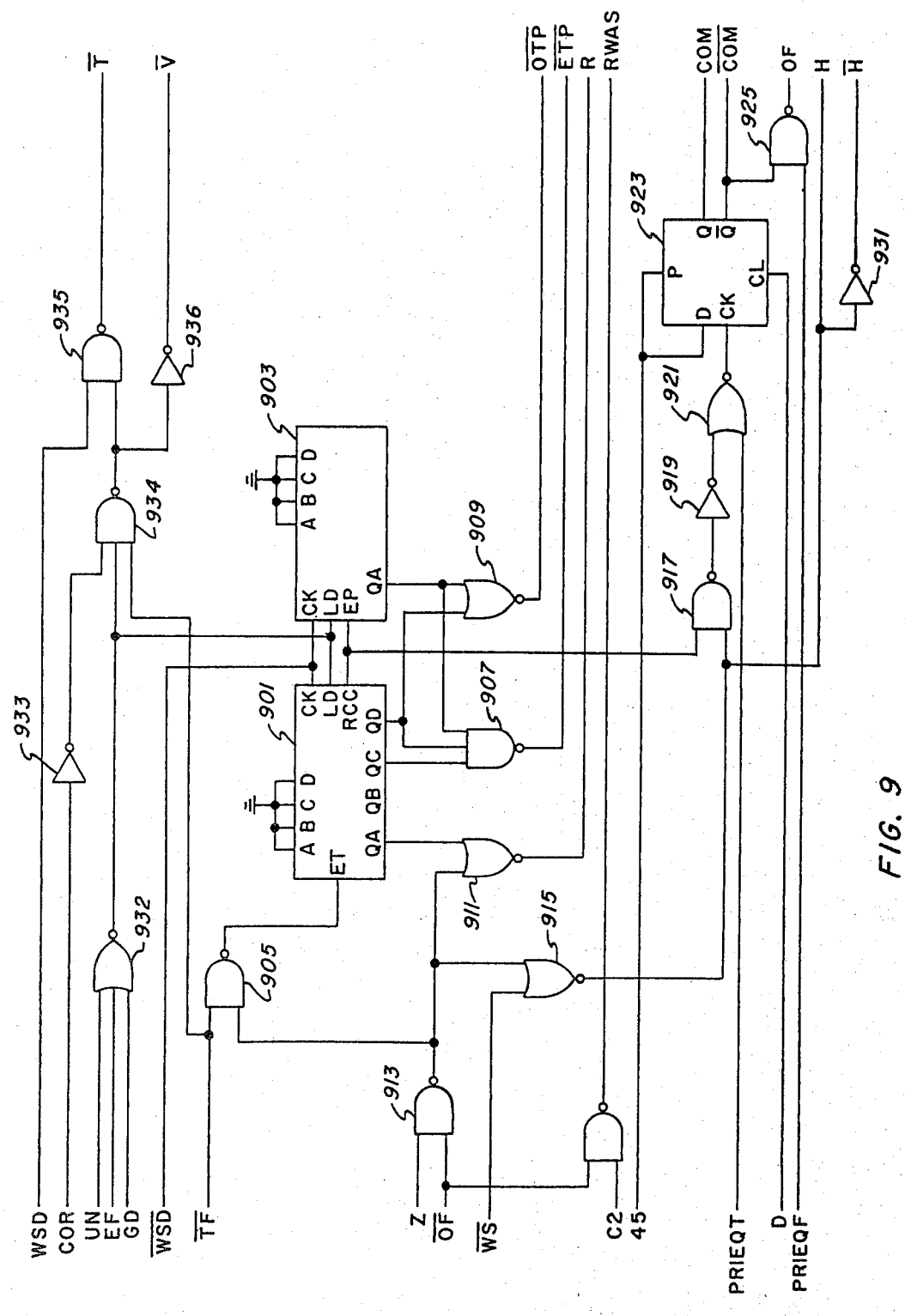
FIG. 9 illustrates a portion of a frame search circuit.

Turning now to FIG. 8, if a signal P1 is produced, the forward correction flip-flop 801 will be set. Gates 803 and 805 are connected such that after flip-flop 801 is set, when the signal WQ1.192 occurs, a correction signal COR is generated. As shown in FIG. 9, the signal COR is used to produce a signal V which in turn, referring to FIG. 7, is applied to the load inputs of counters 126a, 126b and 130 thereby initializing same and producing a forward correction.

Turning back to FIG. 8, if a signal P2 is produced, the backward correction flip-flop 807 will be set. Gate 809 is connected such that after flip-flop 807 is set, when the signal WQ3.64 occurs, gate 805 will generate the signal COR. The signal COR will again be used to generate the signal V on FIG. 7 to initialize the counter.

IN-FRAME MONITOR CIRCUIT

Figure 10:
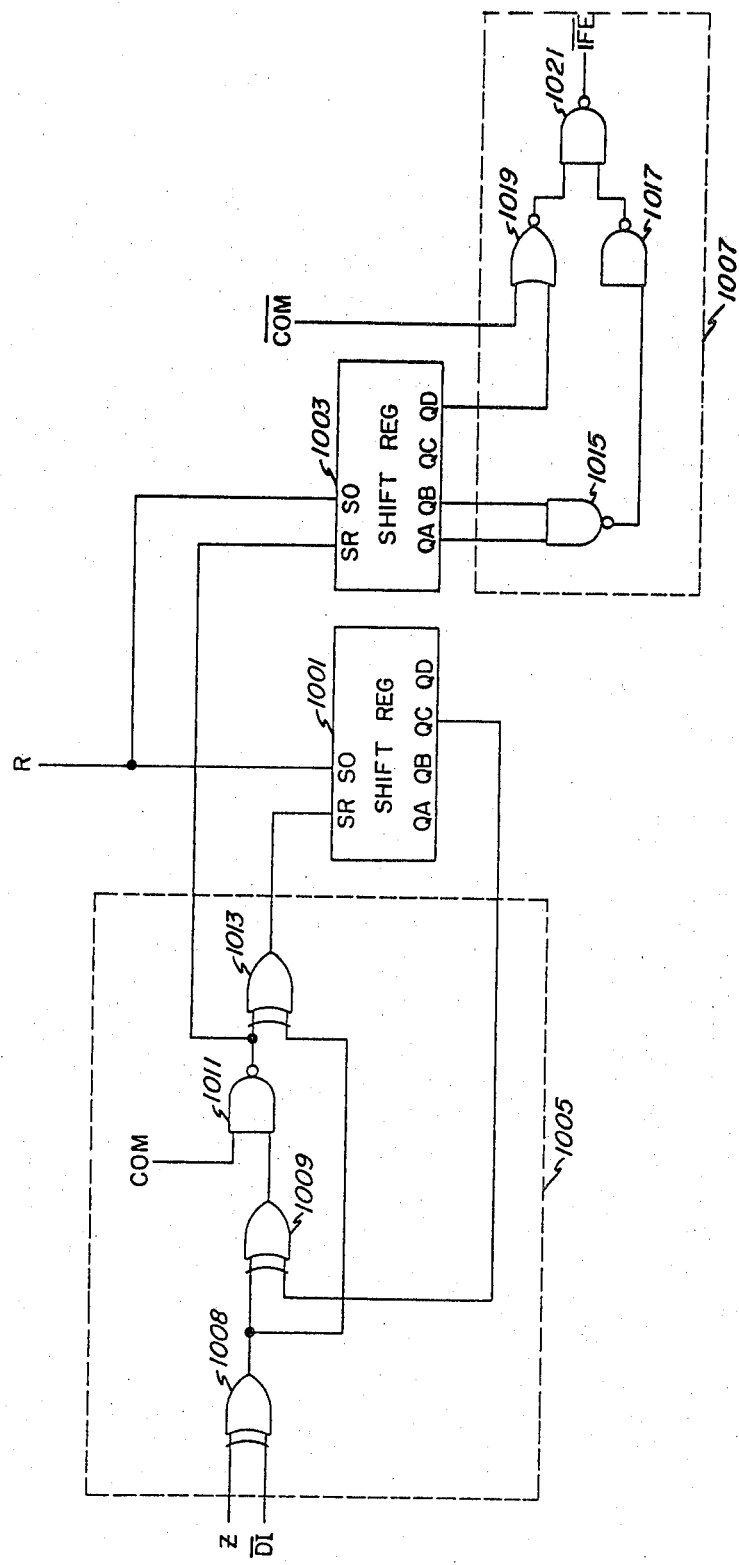
FIG. 10 illustrates a portion of an in-frame monitor circuit.

The in-frame monitor circuit continually checks the framing pattern to which the CTU is locked. In the in-frame mode, the in-frame monitor receives a signal once every two frames from the addressing and control section of the CTU with which to monitor the framing pattern. The circuit shown in FIG. 10 comprises two shift registers 1001, 1003 and two comparison circuits 1005 and 1007. The first shift register 1001 is a recirculating register which contains the pattern to which the CTU is locked in the proper phase. A comparison circuit 1005 compares, bit by bit, the recirculating pattern with the pattern received from the data latch 102. The second shift register is a violation register which stores the results of each comparison of the framing pattern. The violation compare logic 1007 monitors the contents of the violation register for the presence of too many violations.

Immediately upon entering the in-frame mode, a preliminary setup mode occurs. In this preliminary setup mode, the proper framing pattern and phase is stored in the pattern register 1001 and an indication of no violations is put into the violation register 1003. The comparators are not enabled until the 6th framing bit after initially entering this preliminary in-frame mode. The comparators are enabled by a signal on the COM lead. When a signal is received on the COM lead, the comparisons begin, comparing each incoming framing bit with the framing bit which came in six frames earlier. The comparison circuit includes exclusive oR gate 1009 which generates an exclusive oR over the two bits, looking for an opposite state of the two bits. Whenever the incoming bit DI is of the opposite state of the bit which was received six frames ealier, which will be true for the two patterns 101010 and 111000111 in alternate positions, the new bit is shifted into the pattern register 1001 and nonviolation bit or logic "1" is shifted into the violation register 1003. Whenever the new bit is the same as the bit which was received six frames earlier, an error for either pattern, the new bit is inverted by gate 1011 and shifted into the pattern register via exclusive oR 1013 to preserve pattern correctness and a violation or "0" is shifted into the violation register. The violation compare logic is designed to force the unit out-of-frame for several conditions.

a. If there are no changes in the framing bit position, in other words, stuck at "1" or stuck at "0".

b. If another pattern replaces the framing pattern.

c. For phase shifts of the pattern.

Figure 11:
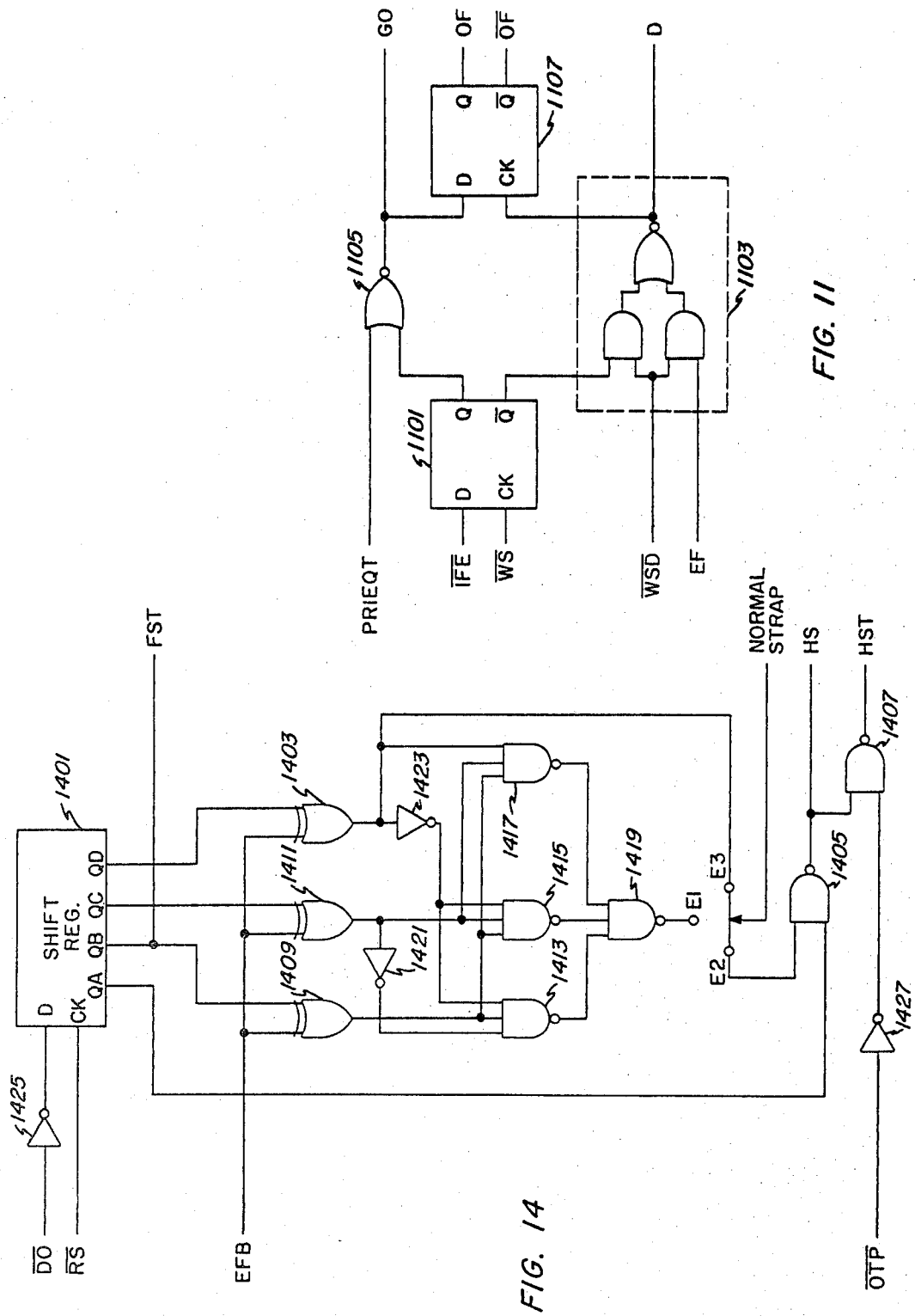
FIG. 11 illustrates another portion of the in-frame monitor circuit.

Any time there are three errors in five examinations, and every time there are two errors in four examinations, except for two adjacent errors only, the comparison logic comprising gates 1015, 1017, 1019 and 1021 generate a signal IFE. As can be seen from FIG. 11, the IFE signal will set the flip-flop 1101 when the WS signal occurs. Upon the next address change edge of WSD, the and-or-invert circuit 1103 and gate 1105 will set the flip-flop 1107 which generates an out-of-frame signal OF and its compliment $\overline{OF}$.

FRAMING SEARCH CIRCUIT

Information coming into the CTU from the T1 line comes in groups of bits called frames. These groups contain 193 bits of information. Of the 193 bits, 192 consist of twenty-four 8-bit voice channels. The 193rd bit or last bit of a frame is a special bit position which is used in alternate frames for two different purposes. In one frame, the 193rd bit contains a framing bit. In the next frame, the 193rd bit contains a signaling bit. This way the framing bit comes into the CTU in the 193rd bit of every other frame and the signaling bit in the frames in between.

The CTU uses the framing bit to identify the 193-bit frame groups as they come in from the T1 line. These frame groups or frames must be identified by the CTU in order to identify further the bit positions of each frame. Since the framing bits occur only once every second frame, there are 386 possible bit candidates, any one of which may be part of the framing pattern. The CTU can operate with either of two framing patterns, one at a time, determined by a strap in the CTU. One pattern is the conventional DC signaling pattern which is alternating 1s and 0s, i.e., 101010. This pattern requires a minimum amount of hardware to check and further requires the least temporary storage and the smallest comparison circuit. The other framing pattern which the CTU can use is described in the aforementioned co-pending Steidl application and comprises three ones followed by three zeroes, i.e., 111000. Framing on this pattern is necessary because of the method of common channel signaling used in the DSS line switch. This pattern requires more temporary storage and a larger comparison circuit to implement. The pattern detection circuit shown in FIG. 14 includes a shift register 1401 and comparison circuitry which may be strapped to detect either of the aforementioned patterns. When a strap is connected as shown between terminals E2 and E3, gates 1403 and 1405 detect the 1010 . . . pattern. When the strap is connected between terminals E1 and E2, gates 1409, 1411, 1413, 1415, 1417, 1419 and 1405 will detect the 000111 pattern. The CTU, in the search mode then, depending upon which option it is strapped for, will examine the incoming bits looking for one of these two patterns. When it finds the bit position that satisfies one of these two patterns, it will continue to examine that bit position for a length of time called the confidence count. In order to assure that a bit position contains the intended framing pattern and is not a result of the contents of another bit position temporarily aliasing the framing pattern, this confidence count in the CTU is set at 24 observances of the candidate bit. The memory 108 is used in the search mode for purposes of temporarily storing information while searching for the framing bit pattern. In the memory 109 are stored the three most recent occurrences of the framing bit position or candidate being searched and one history bit which indicates the accumulated history of previous examinations of that bit position. Framing on the—111000—pattern makes it necessary to store the three most recent occurrences of the framing bit position. In framing on the alternating ones and zeroes pattern, only the most recent occurrence of the framing bit position need be stored.

For each bit position then, four bits of the RAM are used for storage. In the 256 bits of the RAM there is room for temporary storage for 64 candidate bits. For this reason, the CTU can search 64 bit candidate positions in one group during the search mode using the same 256×1 bit RAM used for the voice elastic store. It would take six such groups called Frame Search Groups to examine 384 of the 386 bit positions. Table 2 of FIG. 12 itemizes the bits of each Frame Search Group. The table is arranged in the order in which the candidate bits are searched after a misframe, numbered with 0 being the first bit occurring after the previously used framing bit. There are 64 candidates in each group. In order to make the search of each group of 64 bits as identical as possible to save hardware, the actual search is performed in eight groups of 64 bits with some repetition of bit positions being examined in the eight groups. If the pattern is not present, the search will continue indefinitely.

Figure 13:
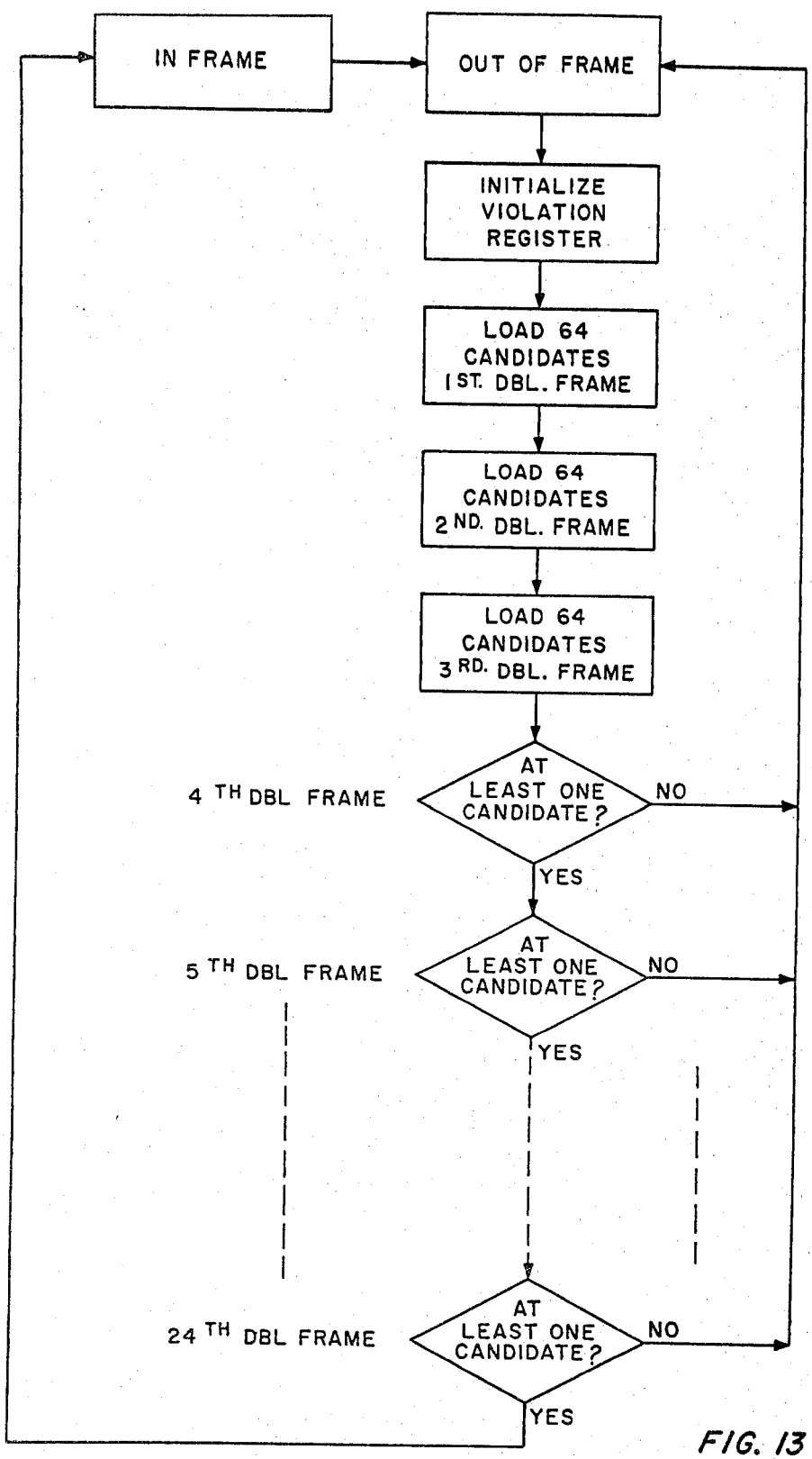
FIG. 13 is a flow diagram illustrating the frame search states.

As shown in the Framing Flow diagram of FIG. 13, the search begins with the bit immediately following the transfer of mode from in-frame to out-of-frame. All counters and control flip-flops which control the framing search mode are reset. The search beings with a preliminary storage duration of six frames (one 3-pass) during which no comparisons are made. During this preliminary mode, three occurrences of the first group of 64 candidates are stored in memory 108 along with one history bit HST to indicate that every candidate is successful whether or not it is successful. No candidates will be eliminated as the result of this during the first three occurrences. The 64 that are stored during this preliminary mode are the first bit, fifth bit, ninth bit, etc. occurring after the search has begun.

When 256 incoming time slots have passed, the write enables to the memory 108 are inhibited until after the 286th time slot when the second occurrence of the 64 bit positions will begin. The data selector 110 is used to shift information concerning each bit position in the memory 108 from the shift register 1401 shown in FIG. 14 beginning with the next occurrence of that bit position. For each bit accepted, there are several shifts involved. The sequence of events in a particular time slot defined by a stable address is established by the usual sequence of Read Strobe, Write Strobe, and Write Strobe Delayed. After the address, say address 0, becomes stable, the output DO (two frames old) of the memory 108 fed by the address is shifted into the four-bit shift register 1401 by the trailing edge of Read Strobe RS. During the write phase, the Write Enable writes the new bit which has been latched at the input and is fed to the memory 108 by the data selector 110 into address 0. The address then changes to address 1 and the Read Strobe RS shifts the contents (four frames old) of RAM address 1 into the shift register 1401 and the bit previously shifted from address 0 is written during the write phase into address 1. The address changes to address 2, the Read Strobe RS shifts the contents (six frames old) of address 2 into the shift register 1401, and the bit previously shifted from address 1 is written during the write phase into address 2. The address changes to address 3 and the Read Strobe RS shifts the contents of address 3, the old history bit HST into the shift register 1401. This time the output of the comparison circuitry fed by the new data bit temporarily stored in the flip-flop 414 shown in FIG. 4, the bits from two frames, four frames, and six frames earlier and the old history bit HST is written during the write phase as the new history bit into address 3. Each incoming candidate bit is stored in the flip-flop 414 under control of the selector 411 and gate 413 of FIG. 4. In case of framing on the alternating "1s" and "0s" pattern, the information from four frames and six frames earlier are not included in the comparison. During the preliminary storage duration mentioned above, when no comparisons are made, the comparison circuitry shown in FIG. 14 is overridden by signal OTP via inverter 1427 to always indicate a success for the history bit HST to be stored.

The first time that a meaningful comparison can be made is at the fourth occurrence, during the fourth pass, of the candidate bit. When strapped for operation with the alternating "1s" and "0s" pattern, the comparison circuit generates an exclusive oR only over the last two ocurrences of the candidate bit. This method will force framing on only the alternating—1010—patterns. The comparison circuit, when strapped for operation with the—111000—pattern, consists of three exclusive oRs 1403, 1409 and 1411 which can be satisfied only by the—111000—pattern, not the alternating 101010 pattern to force the system to frame only on the—1110-00—pattern. This insures proper format conversion by the other CTU circuits. The old history bit HST is always checked and once there is a failure for any candidate, that candidate will always fail for the remainder of that group test. During any pass through a test of one group of 64 candidates when comparisons are being made, every history bit which is a logic 1 will also set a latch 1501, the success counter shown in FIG. 15. This latch, if not set in any comparison pass, passes 4 through 24, indicates that the framing bit is not in that group of 64. If set, the latch 1501 indicates that at least one candidate in that group could be the framing bit, i.e., that bit has satisfied the pattern for the present number of passes in that group. During each comparison pass, after the history bit for the 64th candidate of the group is stored in RAM address 255, the search circuitry continues to count time slots, address changes, until address 320. At this time, the success counter is checked to see if there was at least one successful candidate in the most recently completed pass. If there was not, the unsuccessful flip-flop 1503 is set and that group is immediately abandoned at the next Write Strobe Delayed address change edge and a search of a new group of 64 is begun with the bit position currently in time slot 321. This timing of group changes will allow all 386 bit positions to be examined in eight groups. If there was at least one successful candidate in the most recently completed pass, the circuitry continues to the 386th time slot as indicated by the signal $\overline{385}$ to make another pass over the same group. This is facilitated by setting the two frames flip-flop 1507. As long as any pass over a group indicates at least one successful candidate, the passes will continue on that group through the 24th pass. The counters 901 and 903 of FIG. 9 are connected together to count the number of successful passes; the gates 905, 907, 909, 911, 913, 915, 917, 919, 921 and flip-flop 923 cooperate to provide a confidence count of 24 successful occurrences. The remaining gates 931 to 936 provide various combinational functions. During the 24th pass, operation is the same except that when the success counter 1501 is checked, if it has been set during that pass, the success flip-flop 1505 is also set in preparation for changing the mode from out-of-frame to in-frame. The address counter continues to count to the end of two frames. The success flip-flop 1505 than remains set when the 25th pass is begun.

The fact that the success flip-flop 1505 is set during the 25th pass causes the operation of this pass to be unlike the operations in the previous passes. First, the success flip-flop 1505 provides a signal $\overline{EWE}$ via gates 1509 and 1511 which inhibits all Write Enables to the memory 108 so that no changes can take place in the history bit positions during this pass. Second, the SS output of the success flip-flop overrides the two least significant bits of addresses to the memory address selector 112 via gates 740 and 741 shown in FIG. 7 so that during this pass only the history bit addresses will be accessed, i.e., locations 3, 7, 11, 15, etc. Third, the success flip-flop enables the data output of the memory 108 to be read to another latch, the enter-in-frame latch 1509. In this manner, the memory locations which contain the history bits accumulated in the previous 24 passes are read. The objective is to find the history bit position which contains a "1", indicating the candidate which has been successful. Each history bit will actually be read four times in series beginning three time slots before it is normally read. For example, while the address counter sequences from 0, 1, 2, 3, the RAM will be addressed with 3, 3, 3, 3. This way, the history bit, which indicates the successful candidate, will be read in the time slot that the next occurrence of the actual candidate will occur. When the bit is 0, an unsuccessful candidate is indicated, and the read address counter 178 will continue the count three more times seeing the same "0" history bit three more times. This will happen for every "0" history bit. When a "1" history bit comes up, it will cause the setting of the enter-in-frame flip-flop at the trailing edge of the next Read Stobe during the time slot of the successful candidate. When this happens, the next address change edge, the trailing edge of Write Strobe Delayed WSD will change the mode to in-frame and reset all counters, etc. for the in-frame mode. This resetting operation will be explained more fully hereinbelow.

The maximum reframe time measured from the start of the search to the in-frame indication is 49.3 ms. This occurs when the last candidate examined is the true candidate and when all other bit positions appear to be the true pattern for 23 successive observances.

The gates 1513, 1515, 1517, 1519, 1521, 1523 and 1525 provide the various combinational functions necessary to control the frame search flip-flops.

FRAME ALIGNMENT

Since the DSS accomplishes switching by exchanging time slots of incoming frames, it is convenient for the purpose to align incoming frames with the frame reference used by the switching system. This is accomplished by inserting variable amounts of delays in series with each incoming T1 line so that the total delay of the particular line, plus the inserted variable delay, will cause the incoming frame to be time aligned with the system frame. The variable delay in the CTU is provided by the memory 108 and a signal storage buffer register or addressable latch 112 which are written into at the incoming line rate. Information is read out of the memory 108 and the addressable latch 112 at the office rate by timing and read addresses which are received from the control and timing circuit. The delay increment at any given time is represented to approximately 1-bit resolution by the numerical difference between the write and read addresses. For purposes of frame alignment alone, not counting implementation necessities, a maximum variable delay of one frame is necessary. Because of delay variation and related effects described later and due to implementation needs, a delay of more than one frame is necessary. The extra delay is realized by part of the 256 bit memory 108 which exceeds the 192 bits of voice data in one frame and by the amount of signal and parity storage which exceeds one bit per frame. With a maximum delay of approximately one frame, it is possible then to frame align to the system frame reference any incoming T1 line at whatever one bit incremental timing distance from the system frame reference it might arrive.

For frame alignment purposes, the CTU must attach to each non-frame aligned incoming bit an identifier which the system can use to identify the same bit after frame alignment. This is accomplished by the 1:1 correspondence which is set up between the write address used when the CTU writes the incoming bit and the read address used when the system reads that bit. To facilitate the alignment process which makes use of the 256×1 RAM and the signaling and parity store, an addressing scheme is used which, in addition to the 8-bits of write addressing for the RAM, also uses two extra bits to form a second counter called the write quadrant counter. In using a single 256×1 RAM for delay equalization, it should be appreciated that, for example, the first third of any incoming frame can actually be written in any of the four "quadrants" of the RAM. This is because the 8-bits of the write address counter are allowed to increment for every incoming time slot except the 193rd framing or signaling bit with address 0 following address 255 in the natural binary counting sequence. The quadrant counter is used to uniquely define each incoming bit and its temporary storage location in the CTU for the system and to simplify the essentially arithmetic function needed to determine the difference between the write and read addresses which can be in different frames. It is the 2.048 MHZ system frame which is the frame reference to which all incoming T1 line frames must be aligned. Information must be fed to the CTU concerning the system frame reference in addition to the addresses needed for the system to read the RAM. The read quadrant counter 132 and read address counter 128 establish a four-frame super-frame which repeats its count every four times.

At the end of the framing search, these read counter outputs are used to determine the proper write address and write quadrant counter at which to start the normal in-frame mode. This is chosen in order to place the incoming write addresses a safe distance ahead of the system read addresses in the RAM. The direction of delay drift (see the section on delay equalization) at the time of changing to the in-frame mode is unknown and random. The elastic store or memory 108 contains approximately $1\frac{1}{3}$ frame cells. The CTU places the write address in the range from approximately one-sixth to approximately one and one-sixth frames ahead of the system read address at the time of going to the in-frame mode to minimize the likelihood of having delay equalization corrections between reframes. The memory addresses at time of reframe are shown in the table of FIG. 16.

RECEIVE PARITY CHECKING

The receive parity checking circuits calculate parity over a frame of information sent to the output multiplexer 120 to detect errors which may have been introduced by the CTU receive circuitry. Parity is generated over the bits at the input to the final gate which generates the signal for the multiplexer input. Parity over the 192 voice bits of the frame, the framing bit of the first 10-bit channel, and the common channel bit of the 25th 10-bit channel is checked against the corresponding received incoming parity bit previously stored in the parity store. That stored bit was calculated over the same bits, the 192 voice bits and the preceeding two frame signaling and framing bit. If the parity failure is detected, a logic "1" is shifted into a shift register used as a 4-bit soft detector filter. If four parity errors occur during a 12-frame period, a "1" will be latched into the fourth cell of the shift register to set an alarm. If four parity errors do not occur during a 12-frame period, the contents of the shift register will be cleared by the next 12-frame reset signal.

Although but one embodiment of the invention has been shown and described, it will be apparent to those skilled in the art that certain modifications can be made which do not depart from the spirit and scope of the invention.

What is claimed is:

1. A delay correction circuit for use with an elastic store in a time division multiplexed system wherein said elastic store comprises memory means for storing incoming data bits, write address generating means for generating write addresses, each of said write addresses identifying a location in said memory means for storing an incoming data bit, and read address generating means for identifying a location in said memory means for reading a stored data bit, said delay correction circuit comprising:

first means responsive to one of said read or write address generating means generating a predetermined address for determining whether the address concurrently generated by the other of said read or write address generating means is within a predetermined range of addresses and for providing a first indication signal if said concurrently generated address leads said predetermined address and a second indication signal if said concurrently generated address lags said predetermined address;

second means responsive to said first indication signal and the generation of a second predetermined address by one of said read or write address generating means for initializing the other of said read or write address generating means to a third predetermined address; and third means responsive to said second indication signal and the generation of a fourth predetermined address by one of said read or write address generating means for initializing the other of said read or write address generating means to a fifth predetermined address.

* * * * *